(12) United States Patent
Park

(10) Patent No.: US 8,248,827 B2
(45) Date of Patent: Aug. 21, 2012

(54) CIRCUIT FOR OUTPUT CURRENT DETECT, CIRCUIT FOR OUTPUT CURRENT FEEDBACK, AND SMPS WHICH LIMITS OUTPUT CURRENT BY PRIMARY SIDE FEEDBACK

(76) Inventor: Chan Woong Park, Seoul (KR)

( * ) Notice: Subject to any disclaimer, the term of this patent is extended or adjusted under 35 U.S.C. 154(b) by 538 days.

(21) Appl. No.: 12/513,135

(22) PCT Filed: Oct. 22, 2007

(86) PCT No.: PCT/KR2007/005171
§ 371 (c)(1),
(2), (4) Date: Apr. 30, 2009

(87) PCT Pub. No.: WO2008/054083
PCT Pub. Date: May 8, 2008

(65) Prior Publication Data
US 2010/0110734 A1 May 6, 2010

(30) Foreign Application Priority Data

Nov. 1, 2006 (KR) .................. 10-2006-0107261
Mar. 14, 2007 (KR) .................. 10-2007-0024974

(51) Int. Cl.
*H02M 3/335* (2006.01)

(52) U.S. Cl. ................. 363/21.16; 363/21.12

(58) Field of Classification Search .................. 363/16, 363/21.01, 21.12–21.18, 95, 97, 131
See application file for complete search history.

(56) References Cited

U.S. PATENT DOCUMENTS

| | | | |
|---|---|---|---|
| 5,796,595 A * | 8/1998 | Cross | 363/71 |
| 5,818,703 A | 10/1998 | Jacobson | |
| 6,385,061 B1 | 5/2002 | Turchi et al. | |
| 6,728,117 B2 | 4/2004 | Schemmann et al. | |
| 7,616,455 B2 * | 11/2009 | Cameron et al. | 363/16 |
| 7,995,361 B2 * | 8/2011 | Park | 363/21.12 |
| 2010/0002480 A1 * | 1/2010 | Huynh et al. | 363/90 |

FOREIGN PATENT DOCUMENTS

KR   10-2006-0100041 A   9/2006

OTHER PUBLICATIONS

International Search Report for International Application No. PCT/KR2007/005171.

* cited by examiner

*Primary Examiner* — Matthew Nguyen
(74) *Attorney, Agent, or Firm* — Caesar, Rivise, Bernstein, Cohen & Pokotilow, Ltd.

(57) ABSTRACT

A discontinuous mode flyback converter for limiting output current using primary feedback is disclosed. A transformer stores magnetic energy using field current and transfers the magnetic energy using a primary winding and a secondary winding closely coupled to the primary winding. A switching element is coupled to one end of the primary winding of the transformer and controls the current of the primary winding of the transformer. A control unit controls the switching element. A voltage error feedback unit feeds back the error of the output voltage of the transformer to the control unit, thereby regulating the output voltage. An output current feedback circuit detects the flyback period of the transformer, detects the output current information of the transformer from the rate of a flyback period in a cycle, and feeds it back to the control unit, thereby limiting the output current of the transformer.

10 Claims, 13 Drawing Sheets

[Fig. 1] Prior Art
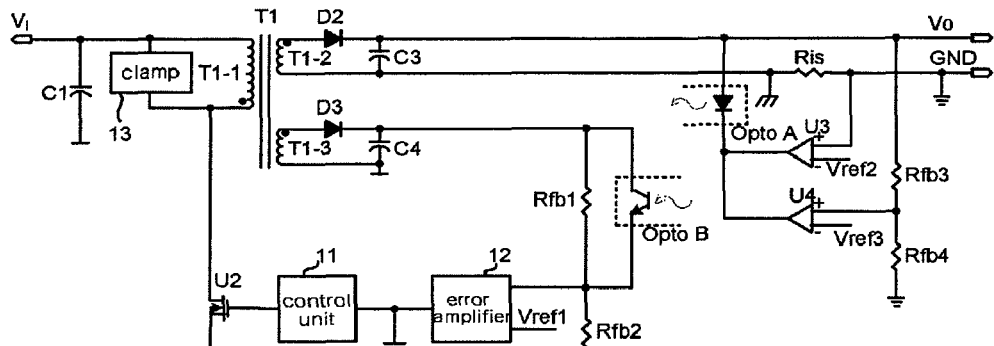
[Fig. 2]
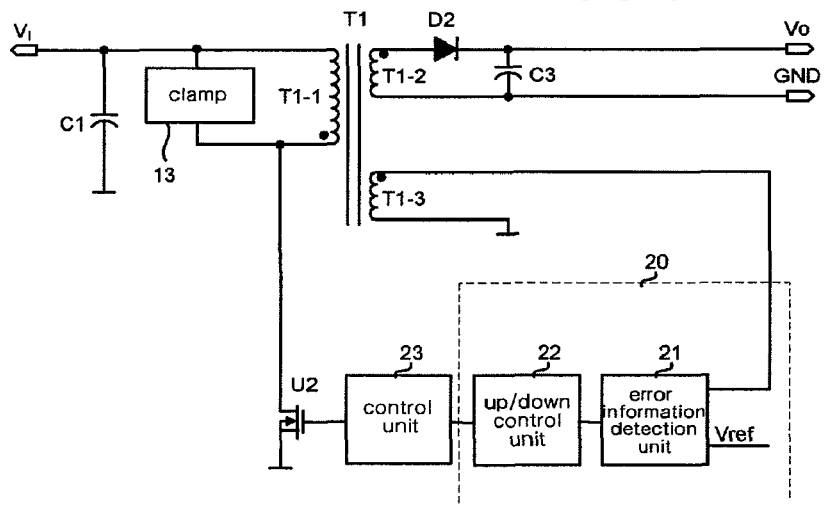
[Fig. 3]
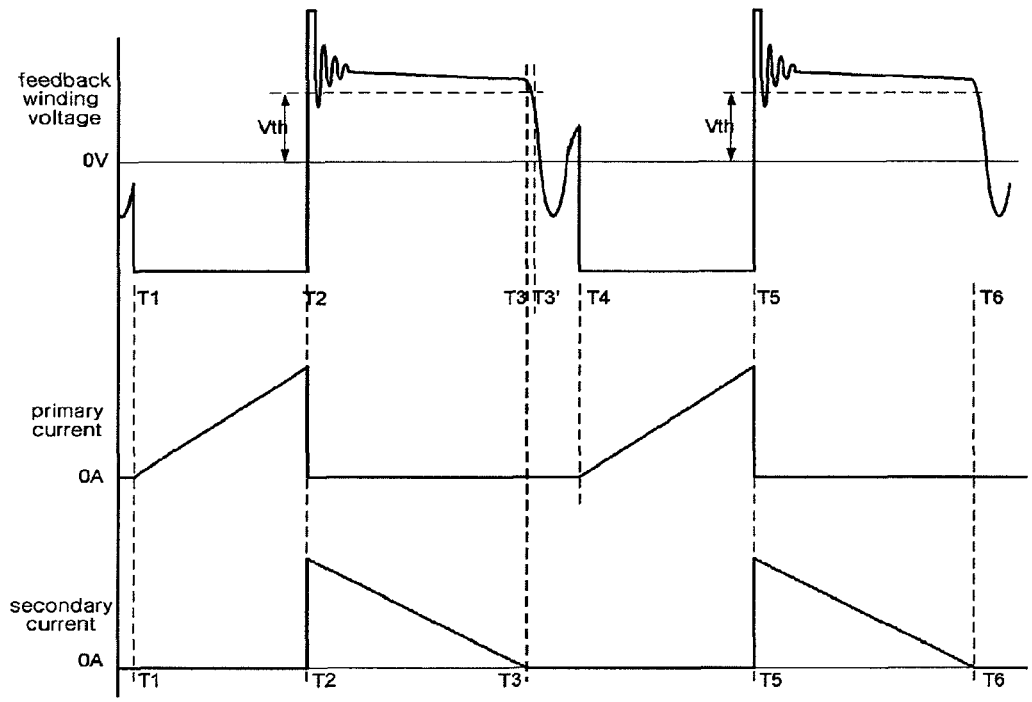

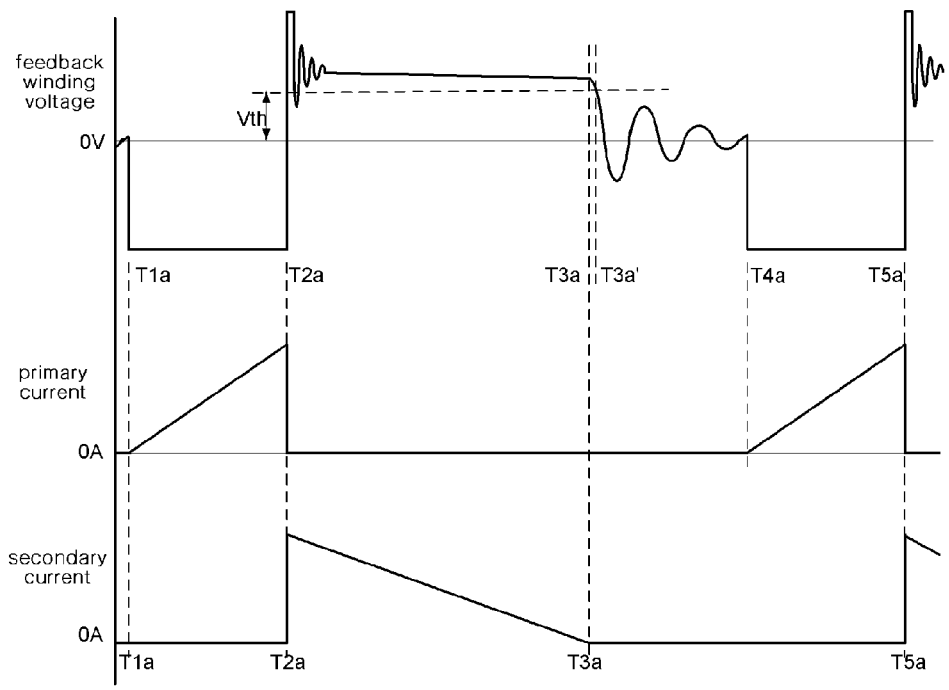
[Fig. 4]
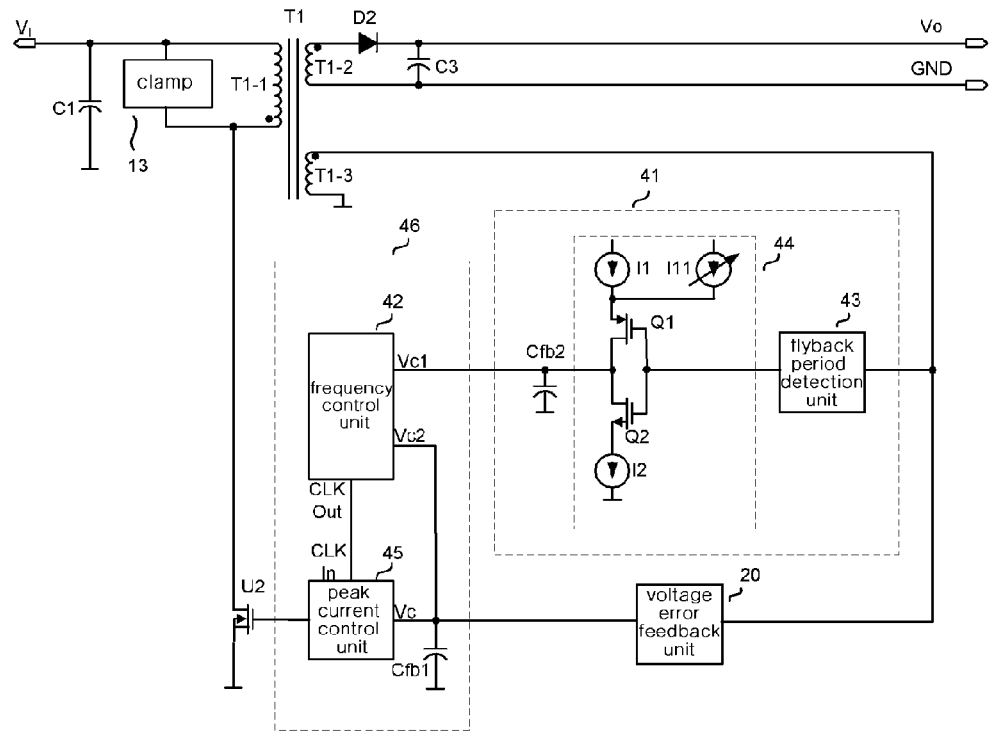
[Fig. 5]

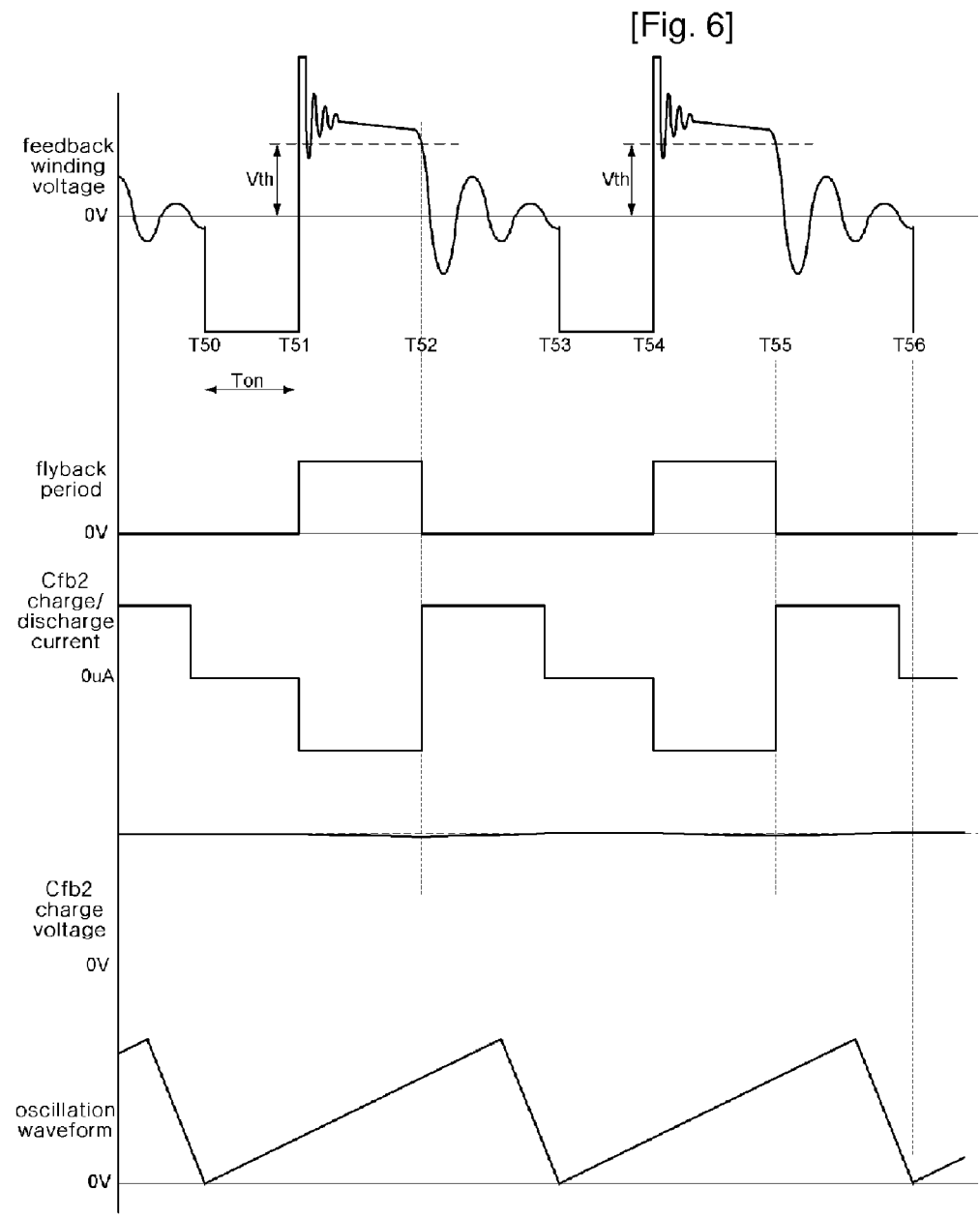

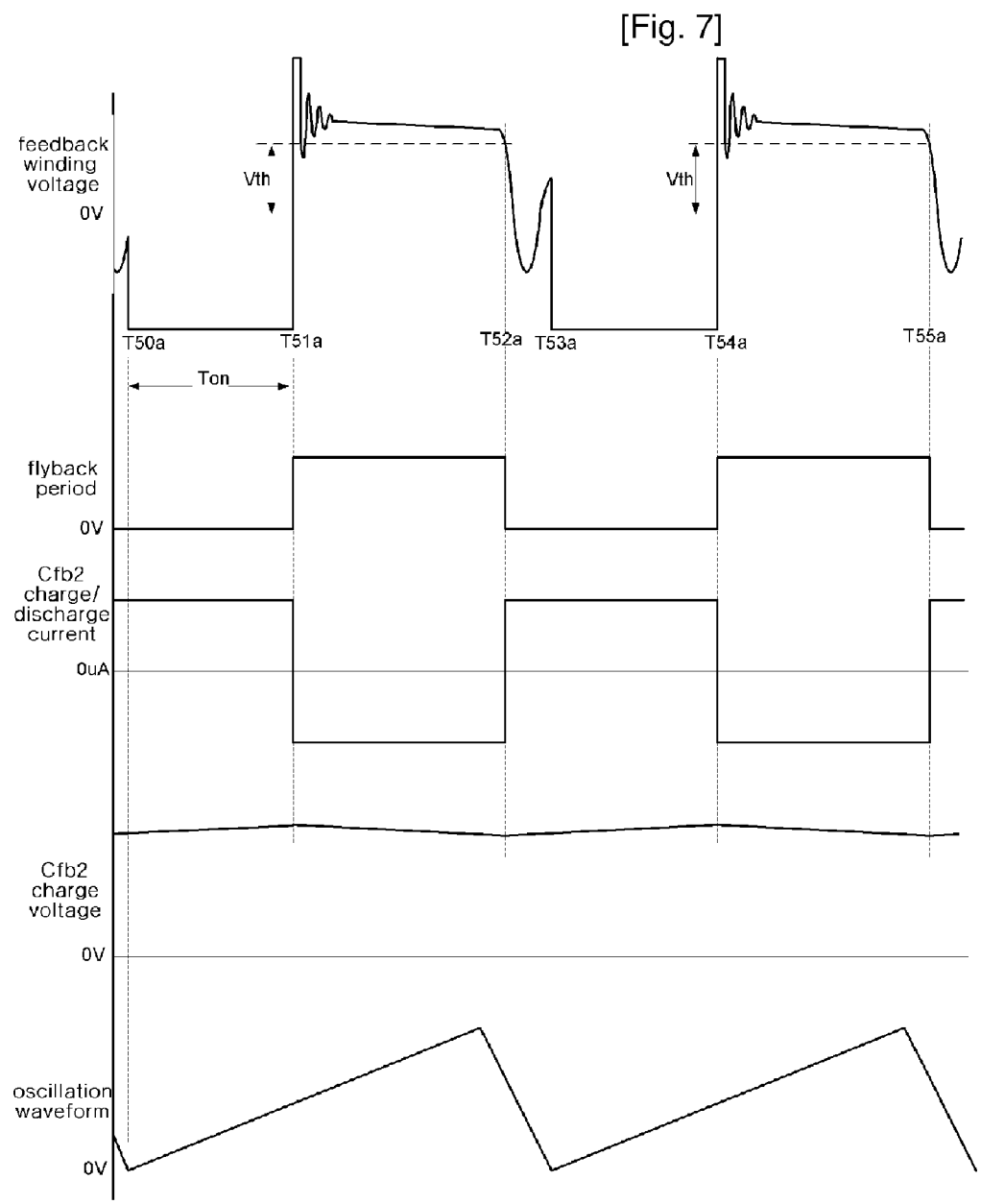

[Fig. 8]
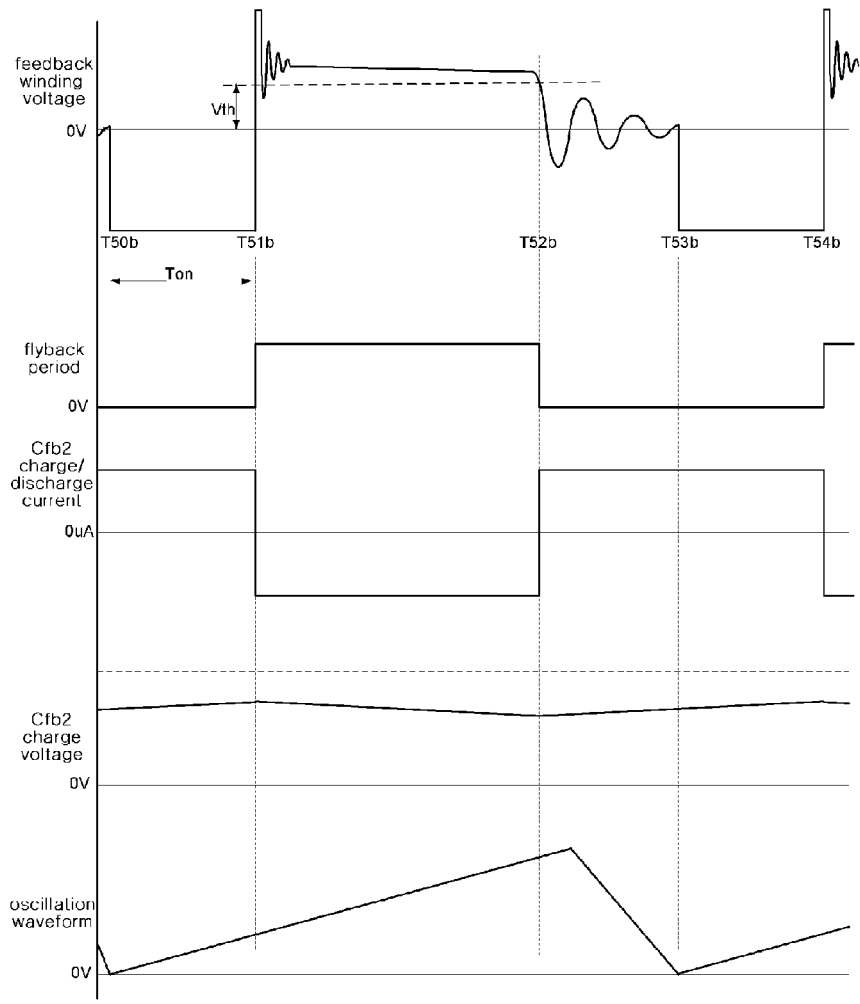
[Fig. 9]
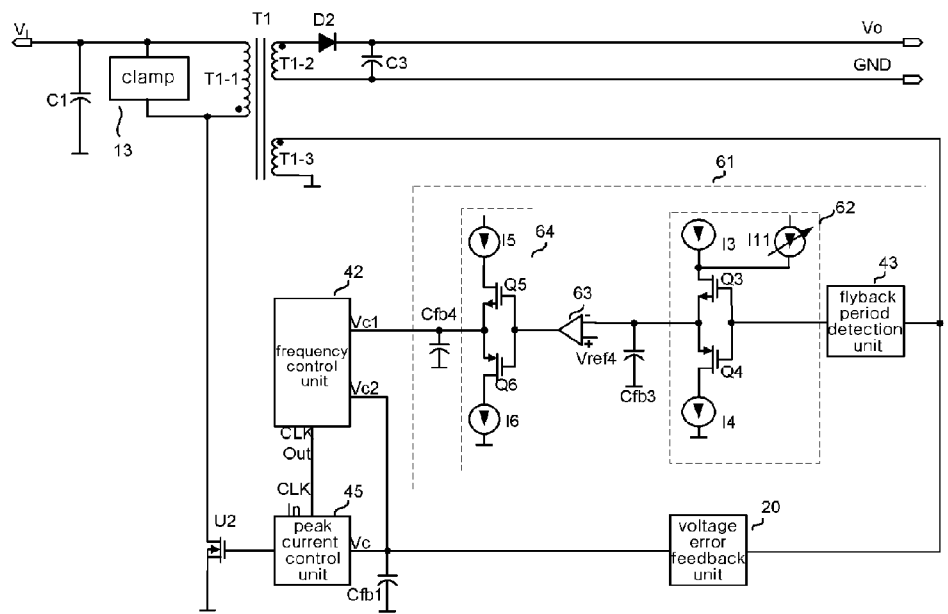

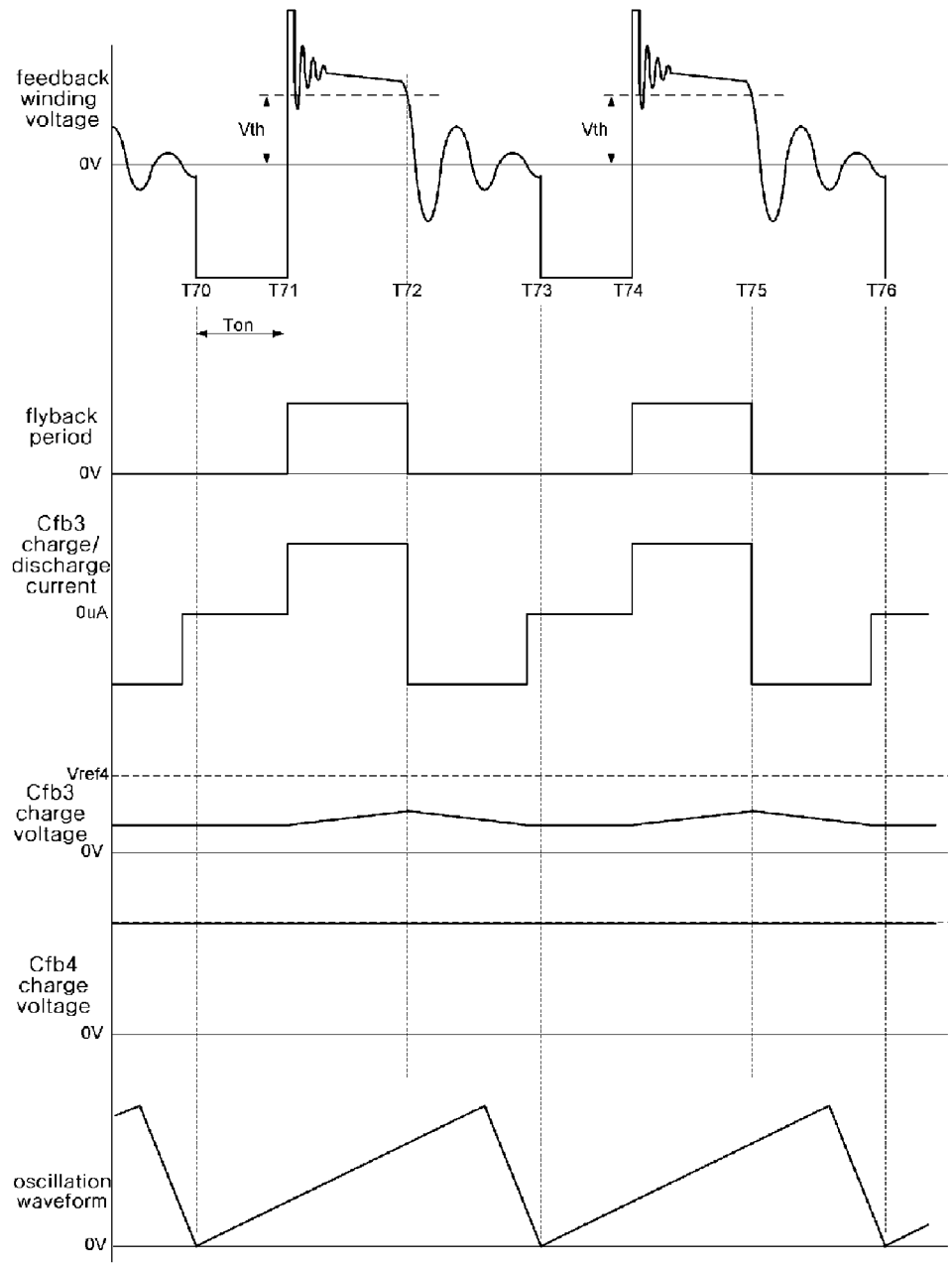
[Fig. 10]

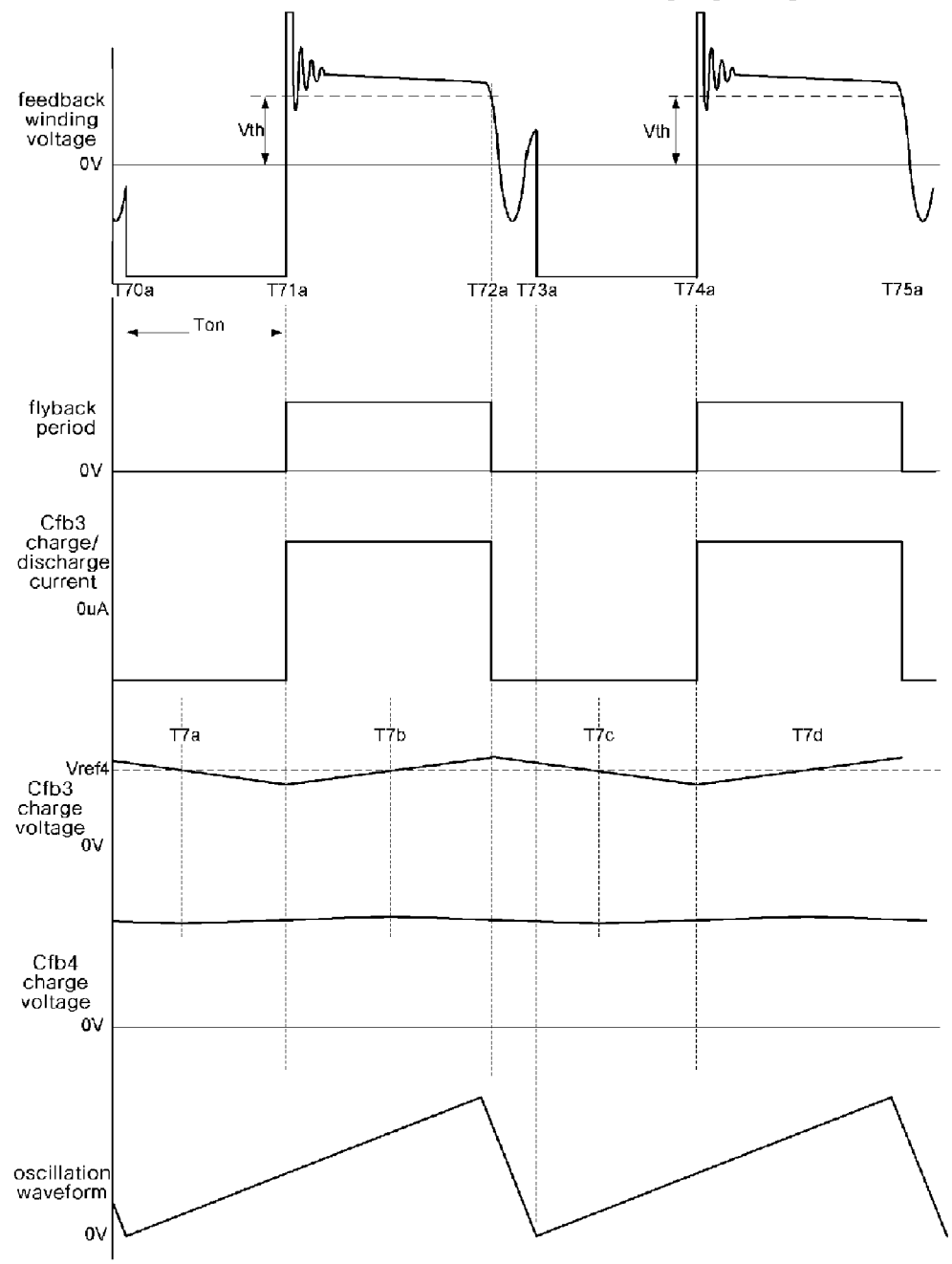

[Fig. 12]
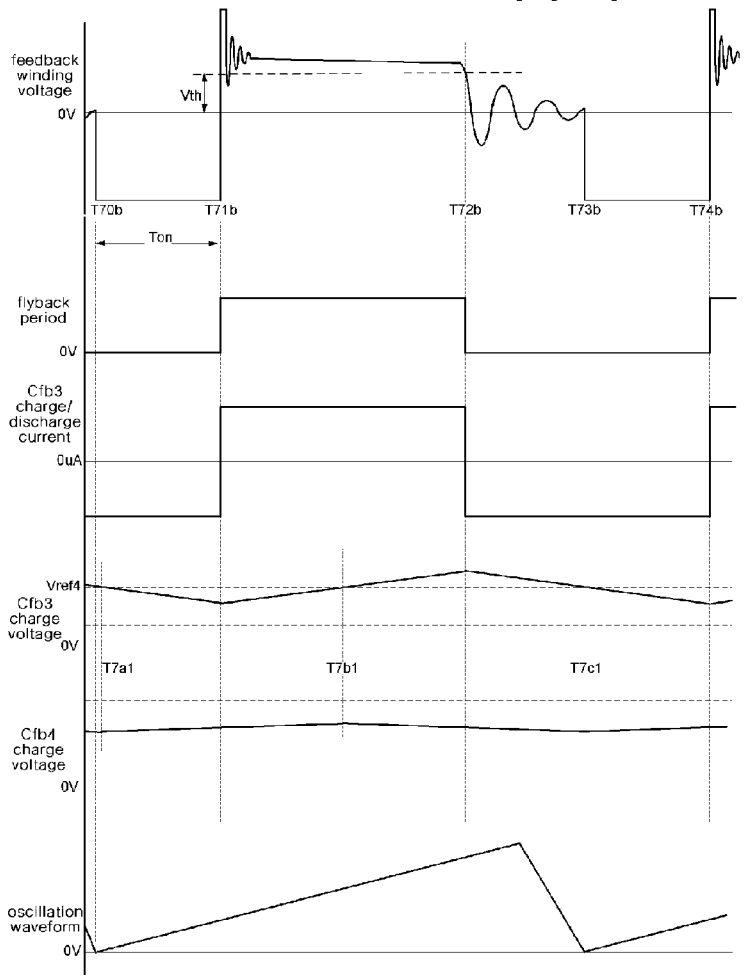
[Fig. 13]
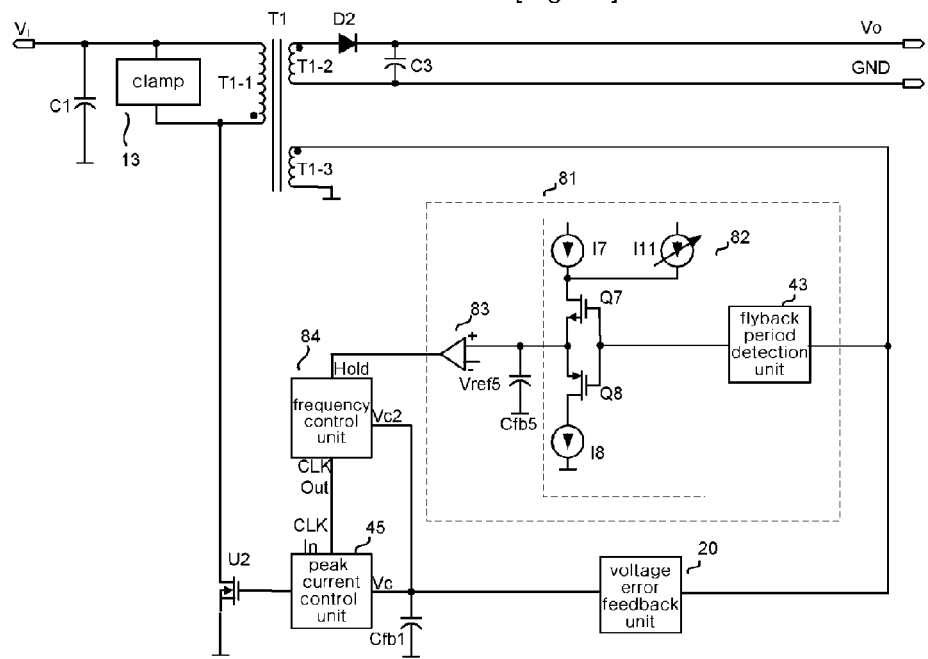

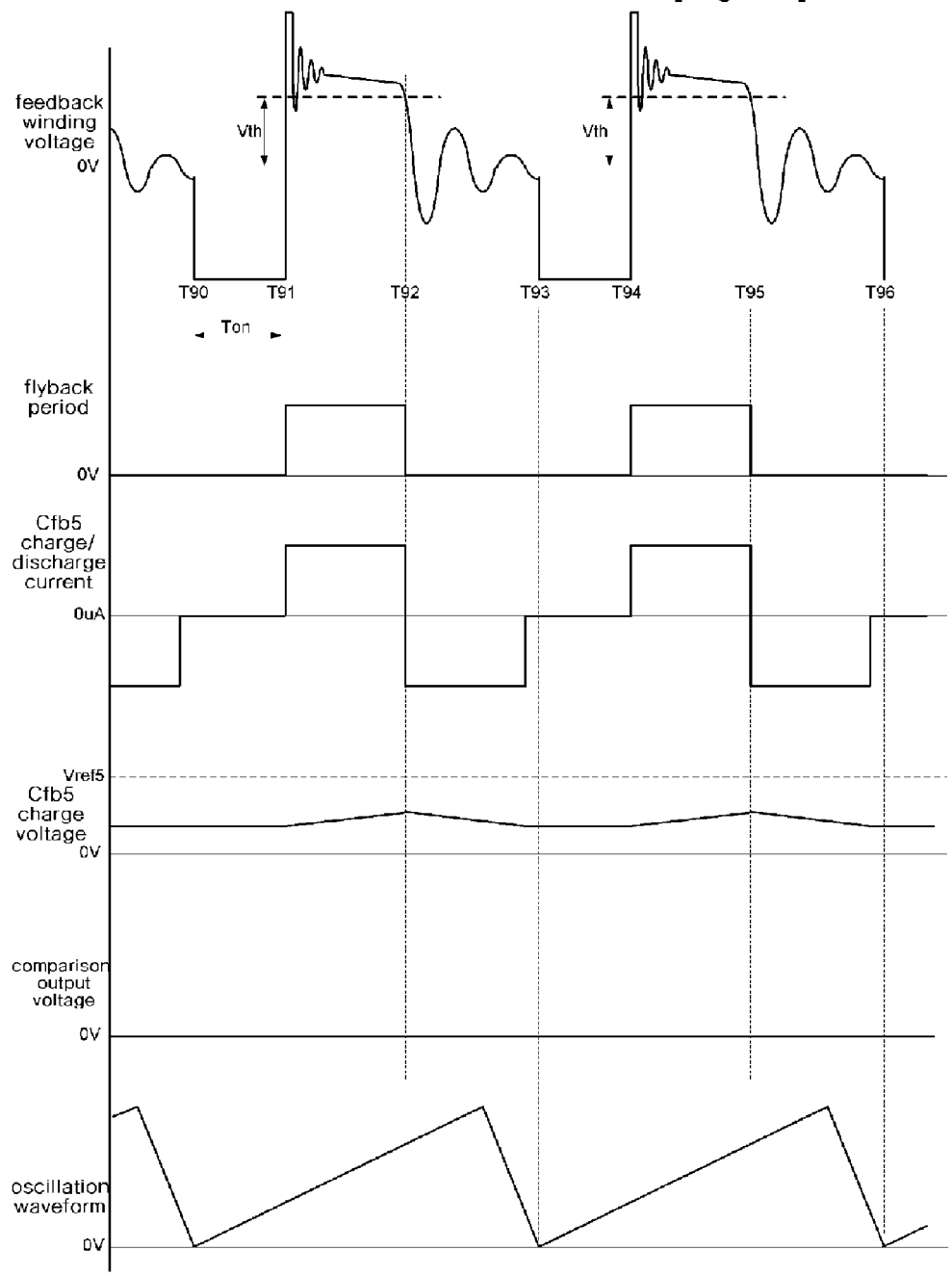
[Fig. 14]

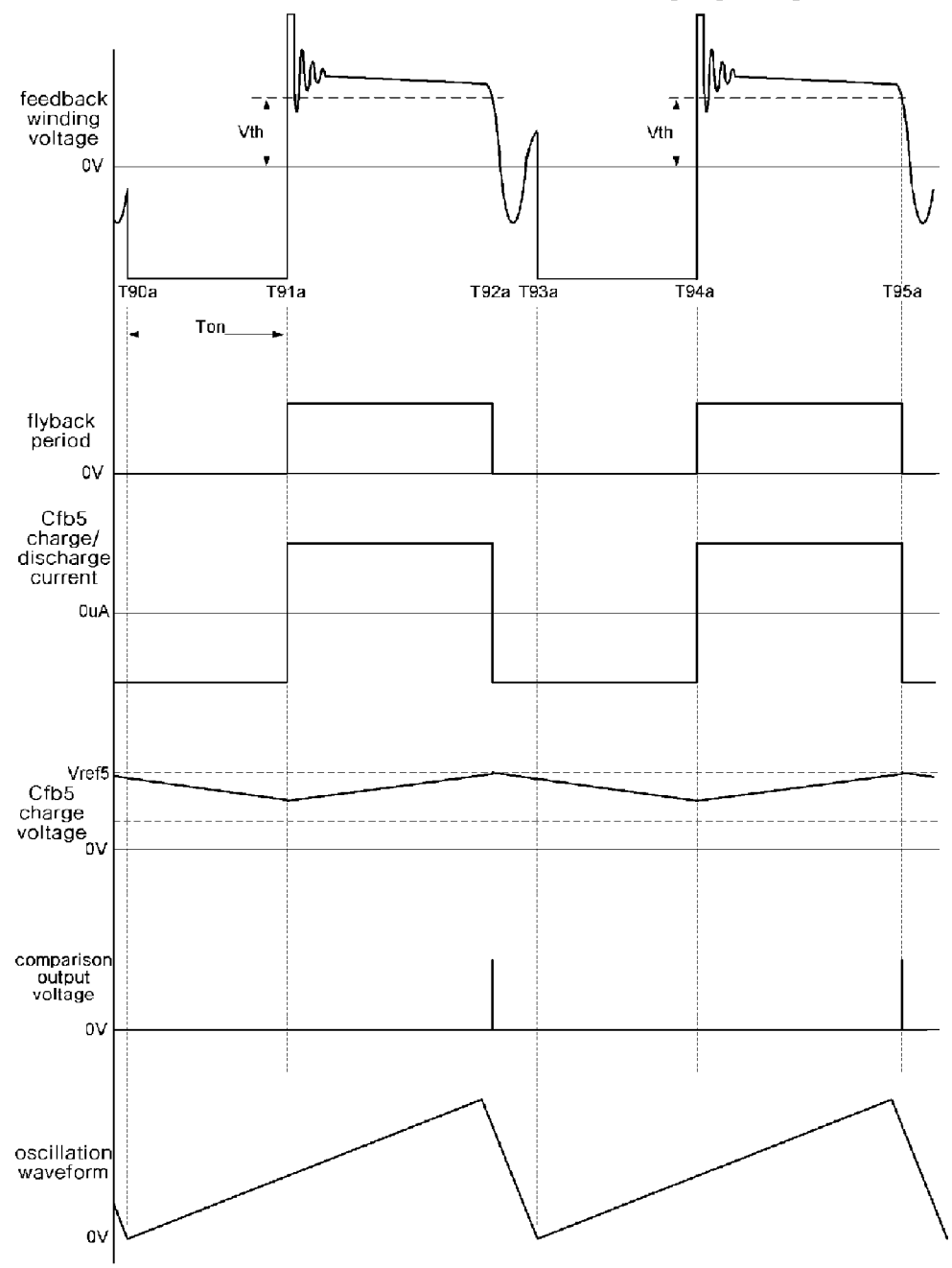

[Fig. 16]
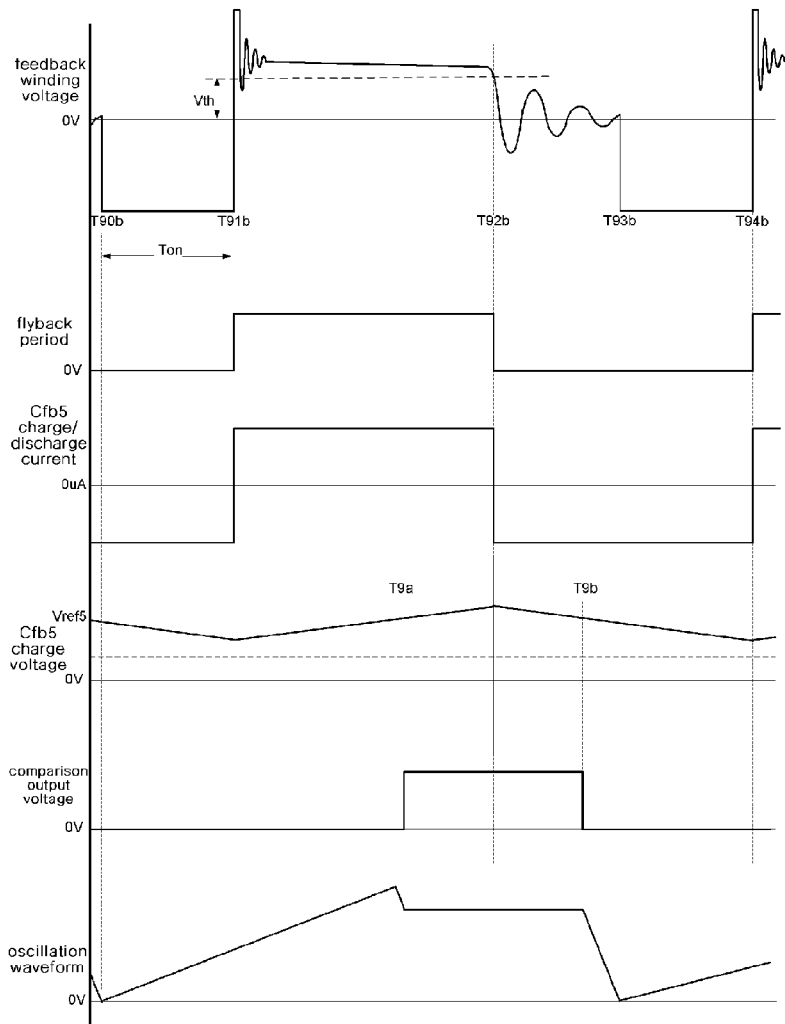
[Fig. 17]
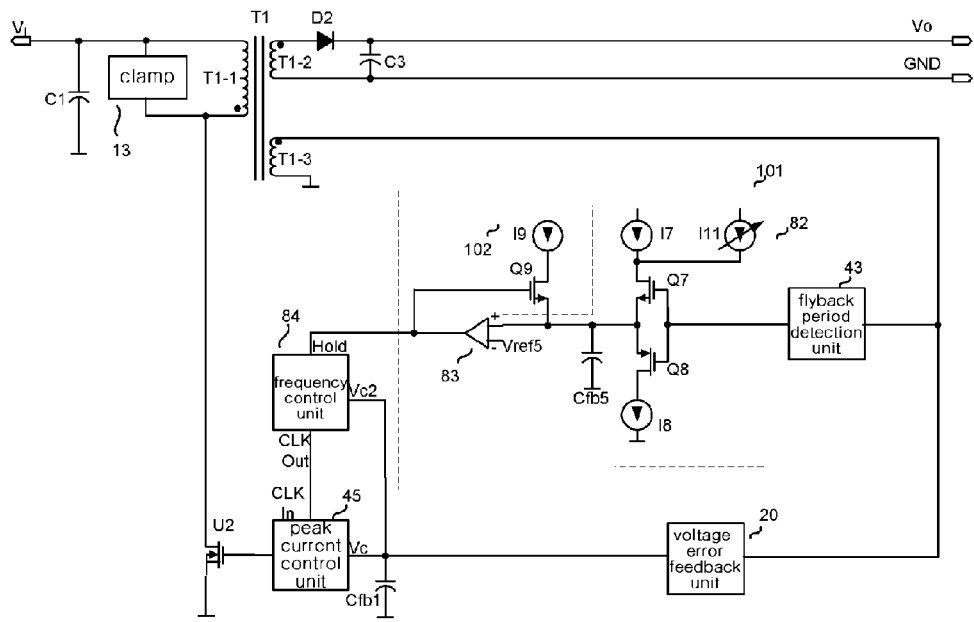

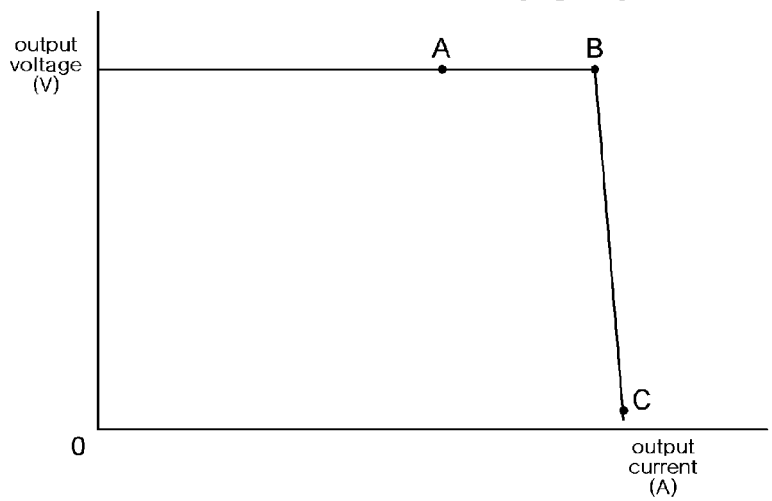
[Fig. 18]
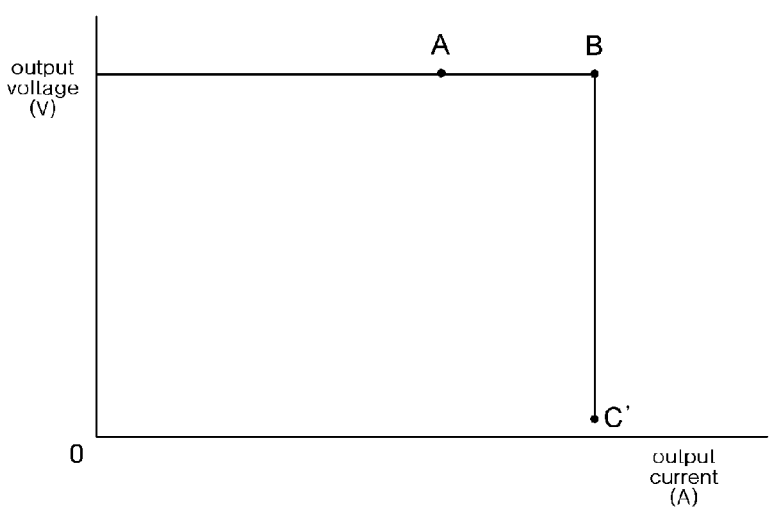
[Fig. 19]
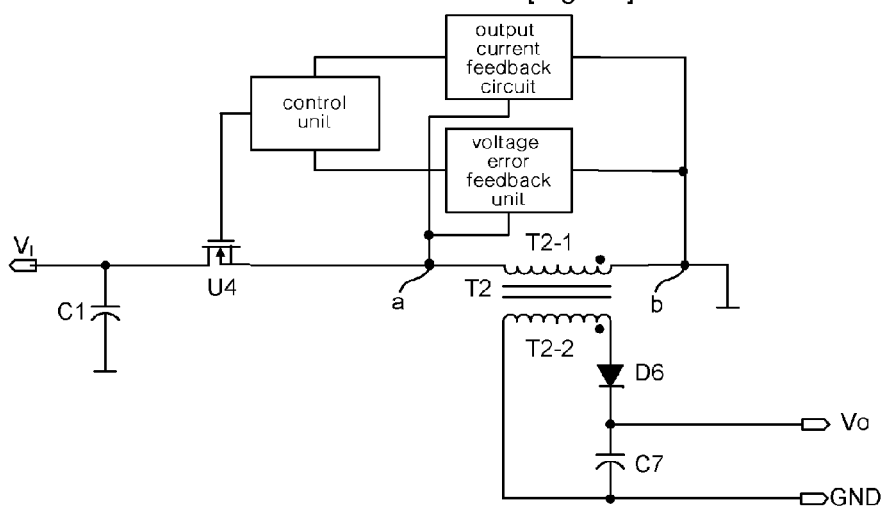
[Fig. 20]

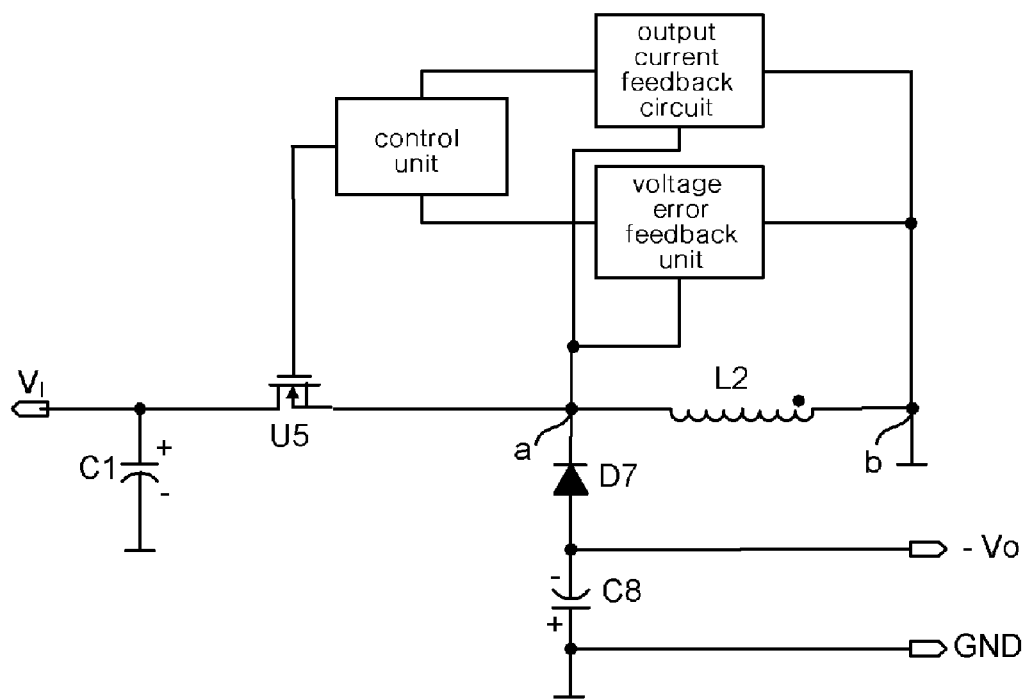
[Fig. 21]

CIRCUIT FOR OUTPUT CURRENT DETECT, CIRCUIT FOR OUTPUT CURRENT FEEDBACK, AND SMPS WHICH LIMITS OUTPUT CURRENT BY PRIMARY SIDE FEEDBACK

CROSS-REFERENCE TO RELATED APPLICATIONS

This national stage application claims the benefit under 35 U.S.C. §371 of International Application No. PCT/KR2007/005171 filed on Oct. 22, 2007, entitled CIRCUIT FOR OUTPUT CURRENT DETECT, CIRCUIT FOR OUTPUT CURRENT FEEDBACK, AND SMPS WHICH LIMITS OUTPUT CURRENT BY PRIMARY SIDE FEEDBACK, which in turn takes its priority from Korean Application No. 10-2006-0107261 filed on Nov. 1, 2006 and from Korean Application No. 10-2007-0024974 filed on Mar. 14, 2007, and all of whose entire disclosures are incorporated by reference herein.

BACKGROUND OF THE INVENTION

1. Field of Invention

The present invention relates to a circuit for detecting output current information from the winding voltage of a transformer in a Switching Mode Power Supply (SMPS), a circuit for performing feedback to maintain a constant current limit value using the detected output current information even in the case in which the value of a load is equal to or larger than a set value, and an SMPS for limiting output current using primary feedback.

2. Description of Related Art

A power supply circuit for charging the battery of a wireless phone includes a charge current control unit, so that charge current is prevented from exceeding an upper limit value. When an abnormality occurs and charge current abnormally increases beyond the upper limit value, the charge current control unit performs control such that output voltage drops and output current is prevented from exceeding the upper limit value. For this purpose, a general SMPS power supply circuit includes an output current feedback circuit.

FIG. 1 shows the circuit of an SMPS having a function of limiting output current according to the prior art. A serial resistor Ris is installed on a load side, and senses current flowing therethrough. If the value of the current flowing through the serial resistor Ris is equal to or larger than a set value, voltage applied to the serial resistor Ris exceeds reference voltage Vref2. The voltage applied to the serial resistor Ris and the reference voltage Vref2 are input to a comparison amplifier U3, and are compared with each other. The results of the comparison are fed back to an error amplifier 12 on a primary side through an opto-coupler OptoA and an opto-coupler OptoB, are compared with reference voltage Vref1 again, and are amplified. The output of the error amplifier 12 is input as the control input of a control unit 11. When voltage that is higher than the reference voltage Vref2 is applied to the serial resistor Ris, the output of the error amplifier 12 performs control on the control unit 11 such that output voltage drops. Therefore, output current which flows through the load is prevented from exceeding a set value.

The output current feedback circuit of the SMPS having the function of limiting output current according to the prior art of FIG. 1 has a problem of decreased efficiency because power is lost due to the voltage drop in the serial resistor Ris for sensing output current, and a problem of increased cost because, in addition to a main semiconductor circuit on a primary side, relatively expensive components, such as the comparison amplifier U3 and the opto-coupler 'OptoA', should also be used on a secondary side.

BRIEF SUMMARY OF THE INVENTION

Accordingly, the present invention has been made keeping in mind the above problems occurring in the prior art, and an object of the present invention is to provide a circuit for detecting output current information from a feedback winding on a primary side, a circuit for feeding back output current, and an SMPS for limiting the output current using primary feedback, which do not need to use expensive components, such as a comparison amplifier U3 and an opto-coupler 'OptoA'.

In order to accomplish the above object, the present invention provides a discontinuous mode flyback converter for limiting output current using primary feedback, including a transformer configured to store magnetic energy using excitation current and to transfer the magnetic energy using a primary winding and a secondary winding closely coupled to the primary winding, a switching element coupled to one end of the primary winding of the transformer and configured to control the current of the primary winding of the transformer, and a control unit configured to control the switching element, the discontinuous mode flyback converter comprising a voltage error feedback unit for feeding back the error of output voltage of the transformer to the control unit, thereby regulating the output voltage; and an output current feedback circuit for detecting the flyback period of the transformer, detecting the output current information of the transformer from the rate of a flyback period in a cycle, and feeding the output current information back to the control unit, thereby limiting the output current of the transformer.

Further, a circuit for feeding back the output current of a Switching Mode Power Supply (SMPS) based on the winding voltage of a magnetic energy transfer element according to the present invention comprises a flyback period detection circuit configured to detect a flyback period from the winding voltage of the magnetic energy transfer element; an up/down control unit configured to output charge current/discharge current according to the detection output of the flyback period detection circuit; a feedback condenser configured to be charged/discharged with the charge current/discharge current of the up/down control unit; and a frequency control unit configured such that upper limit oscillation frequency is controlled in response to charge voltage of the feedback condenser.

Further, a circuit for feeding back the output current of an SMPS based on the winding voltage of a magnetic energy transfer element according to the present invention comprises a flyback period detection circuit configured to detect a flyback period from the winding voltage of the magnetic energy transfer element; a first up/down control unit configured to output charge current/discharge current according to the detection output of the flyback period detection circuit; a first feedback condenser configured to be charged/discharged with the charge current/discharge current from the first up/down control unit; a comparison unit configured to compare the voltage of the first feedback condenser with a reference voltage; a second up/down control unit configured to output charge current/discharge current according to the output of the comparison unit; a second feedback condenser configured to be charged/discharged with the charge current/discharge current from the second up/down control unit; and a frequency control unit configured such that upper limit oscillation frequency is controlled in response to the charge voltage of the second feedback condenser.

Further, a circuit for feeding back the output current of an SMPS based on the winding voltage of a magnetic energy transfer element according to the present invention comprises a flyback period detection circuit configured to detect a flyback period from the winding voltage of the magnetic energy transfer element; an up/down control unit configured to output charge current/discharge current according to the detection output of the flyback period detection circuit; a feedback condenser configured to be charged/discharged with the charge current/discharge current from the up/down control unit; a comparison unit configured to compare the voltage of the feedback condenser with a reference voltage; and a frequency control unit configured such that oscillation is continued or temporarily stopped based on the output of the comparison unit, and a period during which oscillation is temporarily stopped is controlled in each oscillation cycle.

Further, a discontinuous mode flyback converter, including the output current feedback circuit according to the present invention, comprises a transformer configured to store magnetic energy using excitation current and to transfer energy using a primary winding and a secondary winding, closely coupled to the primary winding, a switching element coupled to one end of the primary winding of the transformer and configured to control the current of the primary winding of the transformer, a control unit configured to control the switching element by feeding back output voltage and output current of the transformer, and a voltage error feedback unit configured to feed back the error of the output voltage of the transformer to the control unit, thereby regulating the output voltage.

Further, a buck-boost converter, including the output current feedback circuit, the buck-boost converter, according to the present invention comprises an inductor for storing and transferring magnetic energy, and the output current feedback circuit detects the flyback period from the feedback winding coupled to the inductor.

Further, a circuit for detecting output current information of an SMPS based on winding voltage of a magnetic energy transfer element according to the present invention comprises a flyback period detection circuit configured to detect a flyback period from the winding voltage of the magnetic energy transfer element; an up/down control unit configured to output charge current/discharge current according to the detection output of the flyback period detection circuit; and a feedback condenser configured to be charged/discharged with the charge current/discharge current from the up/down control unit.

Further, a circuit for detecting the output current information of an SMPS based on the winding voltage of a magnetic energy transfer element according to the present invention comprises a flyback period detection circuit configured to detect a flyback period from the winding voltage of the magnetic energy transfer element; a first up/down control unit configured to output charge current/discharge current according to the detection output of the flyback period detection circuit; a first feedback condenser configured to be charged/discharged with the charge current/discharge current form the first up/down control unit; a comparison unit configured to compare the voltage of the first feedback condenser with a reference voltage; a second up/down control unit configured to output charge current/discharge current according to the output of the comparison unit; and a second feedback condenser configured to be charged/discharged with the charge current/discharge current from the second up/down control unit.

Further, a circuit for detecting the output current information of an SMPS based on the winding voltage of a magnetic energy transfer element, comprises a flyback period detection circuit configured to detect a flyback period from the winding voltage of the magnetic energy transfer element; an up/down control unit configured to output charge current/discharge current according to the detection output of the flyback period detection circuit; a feedback condenser configured to be charged/discharged with the charge current/discharge current from the up/down control unit; and a comparison unit configured to compare the voltage of the feedback condenser with a reference voltage.

Further, a method of limiting output current using primary feedback in a magnetic energy transfer element according to the present invention comprises: a step of storing energy in the magnetic energy transfer element and transferring the energy; a step of switching between the storing energy in the magnetic energy transfer element and the transferring the energy in discontinuous mode; a step of controlling the switching between the storing energy in the magnetic energy transfer element and the transferring the energy; a voltage error feedback step of feeding back the error of the output voltage of the magnetic energy transfer element to the step of controlling the switching, thereby regulating the output voltage; and an output current feedback step of detecting the flyback period of the magnetic energy transfer element, detecting output current information using the rate of a flyback period in a cycle, feeding back the output current information to the step of controlling the switching, and limiting the output current.

According to the present invention, output current information is detected from voltage induced to the feedback winding of a transformer, and feedback controlled, thereby acquiring an advantage in that output current can be preciously controlled without using expensive elements, such as a comparison unit and an opto-coupler. In particular, the output current feedback circuit according to the present invention is embedded in a part of a primary integrated circuit, so that cost is considerably reduced, thereby acquiring advantages in that the cost is reduced, and the cost and time required for assembly are reduced, due to the reduction in the size of power supply circuit and the reduction in the number of components.

BRIEF DESCRIPTION OF THE DRAWINGS

FIG. 1 is a diagram showing the circuit of an SMPS having a function of limiting output current, according to the prior art;

FIG. 2 is a diagram showing the constant voltage regulation circuit using primary feedback according to a new technique;

FIGS. 3 and 4 are waveform diagrams for describing the principle of the present invention;

FIG. 5 is a diagram showing the configuration of an SMPS circuit for limiting output current using primary feedback according to the first embodiment of the present invention;

FIGS. 6 to 8 are waveform diagrams each showing a process of controlling frequency using primary feedback according to the first embodiment of the present invention;

FIG. 9 is a diagram showing the configuration of a circuit for detecting output current information and feeding back output current in order to limit the output current according to a second embodiment of the present invention;

FIGS. 10 to 12 are waveform diagrams each showing a process of controlling frequency using the circuit for detecting the output current information and feeding back the output current according to the second embodiment of the present invention;

FIG. 13 is a diagram showing the configuration of a circuit for detecting output current information and feeding back output current in order to limit the output current according to the third embodiment of the present invention;

FIGS. 14 to 16 are waveform diagrams each showing a process of controlling frequency using the circuit for detecting the output current information and feeding back the output current according to the third embodiment of the present invention;

FIG. 17 is a diagram showing a fourth embodiment of the present invention, which mitigates the current limit error of the circuit for detecting output current information and feeding back output current in order to limit the output current according to the third embodiment;

FIG. 18 is a characteristic diagram showing the voltage-current characteristic of the first to third embodiments;

FIG. 19 is a characteristic diagram showing the voltage-current characteristic mitigated according to the fourth embodiment;

FIG. 20 shows an example in which the circuit for feeding back output current according to the present invention is applied to a flyback converter which does not have an additional auxiliary winding for feedback; and FIG. 21 shows an example in which the circuit for feeding back output current according to the present invention is applied to a buck-boost converter.

DETAILED DESCRIPTION OF THE INVENTION

A circuit for detecting output current information from the winding voltage of the transformer of an SMPS, a circuit for feeding back the output current, and an SMPS for limiting the output current using primary feedback according to embodiments of the present invention will be described in detail with reference to the accompanying drawings below.

The applicant of the present invention invented a circuit for detecting output voltage information from voltage induced to the feedback winding of the transformer of an SMPS and feeding back output voltage, and applied for a patent therefor on Feb. 23, 2007 (Korean Unexamined Patent Publication No. 10-2007-0018333), and the representative circuit is shown in FIG. 2.

Generally, a power supply circuit includes a transformer T1, in which a primary winding T1-1, a secondary winding T1-2, and a feedback winding T1-3 are closely coupled to one another, a switching element U2 connected to the primary winding T1-1, a diode D2 and a condenser C3 configured to rectify and smooth the voltage of the secondary winding T1-2, and a clamp circuit 13 configured to suppress surge spike voltage generated due to leakage inductance.

A voltage error feedback unit 20 according to the prior invention detects the information of the error of output voltage V0 from voltage induced to the feedback winding T1-3, and provides feedback so as to reduce the error in the output voltage Vo. The voltage error feedback unit 20 includes an error information detection unit 21 for detecting the information of the error of the output voltage V0 from voltage induced to the feedback winding T1-3, and an up/down control unit 22 for determining the amount of the error based on output from the error information detection unit 21 and providing feedback according to the amount of the error.

The voltage error feedback unit 20 can detect a voltage error from the AC voltage of the feedback winding and feed back the detected voltage error, or can rectify the AC voltage of the feedback winding to DC voltage, detect a voltage error, and feed back the detected voltage error. Further, the voltage error feedback unit 20 can detect a voltage error from a secondary side, receive an error signal through an opto-coupler, and feed back the error signal.

Corresponding to the prior invention for which the applicant submitted, the present invention realizes an output current regulation circuit for detecting output current information from the feedback winding of a primary side without using a comparison amplifier and opto-couplers, and feeding back output current in a primary feedback manner.

FIGS. 3 and 4 are waveform diagrams describing the principle of the present invention. FIG. 3 shows the winding voltage, primary current waveform, and secondary current waveform of a flyback converter in discontinuous mode in a general power supply circuit.

The waveforms shown in FIGS. 3 and 4 will be described in conjunction with the power supply circuits shown in FIGS. 1 and 2.

In FIG. 3, during the time period T1 to T2, the switching element U2 is turned on, so that current is increased and energy is stored in the primary winding T1-1 of the transformer T1. When the switching element U2 is turned off at a time point T2, energy is transferred to the secondary winding T1-2 by the transformer T1, so that current flows out through the secondary diode D2 from the time point T2.

The current, which flows out through the secondary winding T1-2, is charged in the output condenser C3, and supplied to a load as output current. The average of current supplied from the secondary winding T1-2 in a cycle is the same as an output current value. That is, the average of the current supplied from the secondary winding T1-2 during a time period T2 to T5 is the same as the output current value.

In the case of a discontinuous mode, the average for a time period T2 to T3 is ½ of the peak value of the current of the secondary winding T1-2, and the average for the time period T2 to T5 is obtained by multiplying the value of ½ of the peak value of the secondary current by the rate of the time period T2 to T3 to the time period T2 to T5. If the peak value of the secondary current is fixed, the average of the secondary current is constant when the rate of the time period T2 to T3 to the time period T2 to T5 is kept constant.

If the load is increased and is equal to or larger than a current limit value, current is fixed due to the limiting of the current. Further, since load resistance is low, output voltage drops.

FIG. 4 shows the current waveform when output voltage is low.

When output voltage is low, the current of the secondary winding T1-2 is slowly decreased in proportion to the low output voltage. The average of the secondary current of the waveform of FIG. 4 is the same as the average of the secondary current of the waveform of FIG. 3, when the peak values of the current of the secondary winding T1-2 are the same in FIGS. 3 and 4, and the rate of the time period T2a to T3a to the time period T2a to T5a is maintained at the value corresponding to the rate of the time period T2 to T3 to the time period T2 to T5, shown in FIG. 3.

As described above, in an SMPS in discontinuous mode, even when the load is increased, the peak value of secondary current reaches the maximum value, and the output voltage thereof is decreased, the present invention performs control such that the peak value of the secondary current is maintained at a constant value, and the rate of the time period T2 to T3 to the time period T2 to T5 is maintained at a set value, so that the output value does not exceed the set value.

However, instead of detecting the time period during which current is supplied to the secondary winding T1-2, that is, the time period T2 to T3 and the time period T2a to T3a, in FIGS. 3 and 4, the present invention detects and uses a flyback period T2 to T3' or T2a to T3a' from voltage induced to the feedback winding. In this case, an error may occur due to a time period delayed due to ringing after the current of the secondary winding T1-2 drops to "0". However, this error can be managed within an acceptable error range or can be corrected using an additional circuit.

Embodiments of a circuit for detecting output current information from the winding voltage of a magnetic energy transfer element, a circuit for feeding back output current, and an SMPS for limiting output current based on primary feedback, according to the present invention, will be described with reference to the drawings below.

First Embodiment

FIG. 5 is a diagram showing the configuration of an SMPS circuit for limiting output current using primary feedback according to the first embodiment of the present invention. FIGS. 6 to 8 are waveform diagrams showing the waveforms of the signals of the respective units of a circuit according to the first embodiment.

The SMPS circuit for limiting output current using primary feedback according to the present invention comprises a transformer T1 configured to store magnetic energy using excitation current, and configured to transfer energy using a primary winding T1-1 and a secondary winding T1-2, which is closely coupled to the primary winding T1-1; a switching element U2 coupled to one end of the primary winding T1-1 of the transformer T1, and configured to control the current of the primary winding T1-1 of the transformer T1; a control unit 46 configured to control the switching element U2 using feedback; the feedback winding T1-3 of the transformer T1 configured to obtain the information of output voltage V0 and output current Io; an output current detection circuit 41 configured to detect the information of the output current Io; and a voltage error feedback unit 20 configured to feed back the error of the output voltage.

The output current feedback circuit of the SMPS of the present invention comprises an output current information detection circuit 41 for detecting output current information from voltage induced to the feedback winding T1-3 of the transformer T1, and a frequency control unit 42 for controlling an oscillation frequency based on the output current information output from the output current information detection circuit 41.

The output current information detection circuit 41 comprises a flyback period detection circuit 43 configured to detect a flyback period from voltage induced to the feedback winding T1-3, an up/down control unit 44 configured to output charge current/discharge current according to the result of detection output from the flyback period detection circuit 43, and a feedback condenser Cfb2, which is charged/discharged with the charge current/discharge current of the up/down control unit 44.

The charge voltage of the feedback condenser Cfb2 is applied to the frequency control unit 42, so that the upper limit oscillation frequency of the frequency control unit 42 is controlled.

The operation of the SMPS for limiting output current using primary feedback according to the present invention, having the above-described configuration, will be described.

The switching element U2, which operates in discontinuous mode, is connected to one end of the primary winding T1-1 of the transformer T1. The secondary winding T1-2, closely coupled to the primary winding T1-1 of the transformer T1, is installed as a main energy extraction unit so as to supply energy to the output unit. Further, the feedback winding T1-3 is installed in the transformer T1 so as to extract output current information through the feedback winding T1-3. The flyback period detection circuit 43, which is commonly used, indirectly detects the period during which current is supplied to the load through the secondary winding T1-2 from the voltage extracted from the feedback winding T1-3. Since the flyback period detection circuit 43 comprises logic circuits and is commonly used, a detailed description of the configuration thereof is omitted. The feedback condenser Cfb2 is charged/discharged with current corresponding to a value set by the up/down control unit 44 based on the detected output, and the voltage of the feedback condenser Cfb2 is applied to the control input Vc1 of the frequency control unit 42 and used to control the upper limit oscillation frequency of the frequency control unit 42.

The variation in output load causes the variation in the flyback period of the voltage induced from the feedback winding T1-3 of the transformer T1, and the output current information detection circuit 41 detects and controls the rate of the flyback period, thereby maintaining an output current limit value.

For example, when the load is small, the rate of the flyback period in a cycle is smaller than a set rate. Here, for output voltage Vo, the value of the error of the output voltage is fed back from the voltage error feedback unit 20 and applied to the peak current control unit 45, so that the peak drain current of the switching element U2 is controlled, or is applied to the control input Vc2 of the frequency control unit 42, so that the switching frequency of the switching element U2 is controlled.

In contrast, when the load is large and the rate of the flyback period in a cycle is larger than the set rate, the control input Vc1 of the frequency control unit 42 is controlled based on the amount of feedback detected by the output current information detection circuit 41 shown in FIG. 5 such that the upper limit oscillation frequency of the frequency control unit 42 is decreased. If the upper limit oscillation frequency of the frequency control unit 42 is lower than the oscillation frequency set by being fed back from the voltage error feedback unit 20, the oscillation frequency of the frequency control unit 42 is controlled with reference to the upper limit oscillation frequency value set by the control input Vc1.

The operation of the circuit of FIG. 5 will be described in more detail with reference to the waveform diagrams of FIGS. 6 to 8.

In the waveform diagrams of FIGS. 6 to 8, the waveform 'feedback winding voltage' is the voltage waveform of the feedback winding T1-3 of the transformer T1, the waveform 'flyback period' is the output waveform of the flyback period detection circuit 43, the waveform 'Cfb2 charge current/discharge current' is the waveform of the charge current/discharge current of the feedback condenser Cfb2, the waveform 'Cfb2 charge voltage' is the waveform of the charge voltage of the feedback condenser Cfb2, and the waveform 'oscillation waveform' is the oscillation waveform of the frequency control unit 42.

FIG. 6 is a waveform diagram showing waveforms in a condition in which a flyback period is shorter than a set value.

For the waveform 'feedback winding voltage' of FIG. 6, a time period T50 to T51 indicates the conduction period of the switching element U2.

A time period T51 to T52 is a period during which energy stored in the primary winding T1-1 of the transformer T1 is transferred to the secondary winding T1-2. At the time point T52, the energy transfer to the secondary winding is completed. During a time period T52 to T53, ringing is generated and voltage is gradually and continuously decreased. At the time point T53, a new cycle is started, that is, the switching element is turned on again. Thereafter, the above-described waveform is repeated.

During a flyback period T51 to T52, during which energy is transferred to the secondary winding T1-2, the output waveform of the flyback period detection circuit 43 is at an 'H' level. In contrast, during a non-flyback period T52 to T54, the output waveform of the flyback period detection circuit 43 is at an 'L' level.

During the flyback period T51 to T52, a TR Q2 is turned on and a TR Q1 is turned off, so that the current of the feedback condenser Cfb2 is discharged through a current source I2. During the time period T52 to T54, the TR Q2 is turned off and the TR Q1 is turned on, so that the feedback condenser Cfb2 is charged with the current of current sources I1 and I11. Here, the current source I11 contains a temperature compensation value used to compensate for variation in current attributable to temperature, and an adjustment value that a user uses to adjust the set value of the rate of a flyback period from outside.

The rate of the sum of the currents of the current sources I1 and I11 to the current of the current source I2 determines the rate of a flyback period at which the current control is started. In the case of a load in which the rate of a flyback period is smaller than a set value, the amount of discharge of the feedback condenser Cfb2 during the flyback period is recovered by the charge during a non-flyback period, so that the charge voltage of the feedback condenser Cfb2 is always maintained at a high voltage that is close to the supply voltage Vcc. The voltage is applied to the control input Vc1 of the frequency control unit 42 so as to cause the upper limit oscillation frequency of the frequency control unit 42 to be the maximum value. Further, the oscillation frequency of the frequency control unit 42 is controlled by the control input Vc2 fed back from the voltage error feedback unit 20.

Here, the output voltage is regulated by controlling the oscillation frequency of the frequency control unit 42 by the voltage error feedback unit 20, by controlling the peak drain current value of the peak current control unit 45, or by controlling both of them.

FIG. 7 is a waveform diagram when the rate of the flyback period in a cycle is slightly larger than a set value.

If the amount of discharge of the feedback condenser Cfb2 during a flyback period is slightly larger than the amount of charge during a non-flyback period, the charge voltage of the feedback condenser Cfb2 is gradually decreased as time passes, so that the upper limit oscillation frequency of the frequency control unit 42 is gradually decreased to the oscillation frequency controlled by the voltage error feedback unit 20. If the upper limit oscillation frequency of the frequency control unit 42 is decreased further and the oscillation frequency is decreased, a non-flyback period is increased, so that the charge voltage of the feedback condenser Cfb2 is increased again, and thus the upper limit oscillation frequency of the frequency control unit 42 is regulated at the point at which the upper limit oscillation frequency of the frequency control unit 42 is the same as the oscillation frequency controlled by the voltage error feedback unit 20.

FIG. 8 is a waveform diagram showing the case in which the rate of a flyback period in a cycle considerably exceeds a set value, and the rate of a flyback period is maintained at a set value by controlling a non-flyback period.

In the case in which the rate of a flyback period exceeds a set value, the discharge period of the feedback condenser Cfb2 is longer than the charge period thereof in a cycle, and the charge voltage of the feedback condenser Cfb2 is gradually decreased, so that the upper limit oscillation frequency of the frequency control unit 42 is lower than the oscillation frequency controlled by the voltage error feedback unit 20. Therefore, the oscillation frequency of the frequency control unit 42 is decreased, so that the non-flyback period is increased, with the result that the rate of a flyback period in a cycle is the same as a set value, thereby regulation is realized.

In FIG. 5, the voltage error feedback unit 20 can be constructed such that the voltage error feedback unit 20 provides feedback so as to control only the peak value of the drain current of the switching element U2, to control only the frequency of the frequency control unit 42, or to control both the peak value of the drain current of the switching element U2 and the frequency of the frequency control unit 42.

The control characteristics of the output voltage based on the variation in controlled output current, as shown in FIG. 5, will be described with reference to FIG. 18. Hereinafter the variation in waveforms of FIG. 18 will be described in (i) the case in which both the peak value of the drain current and the frequency are controlled, in (ii) the case in which only the peak value of the drain current of the switching element U2 is controlled, and in (iii) the case in which only the frequency of the frequency control unit 42 is controlled.

First, (i) the case in which both the peak value of the drain current of the switching element U2 and the frequency of the frequency control unit 42 are controlled for the regulation of output voltage will be described.

While output current varies from 0 to the value corresponding to point A, the error of the output voltage is fed back from the voltage error feedback unit 20, so that the peak value of the drain current of the switching element U2 and the switching frequency are controlled, and thus the output voltage is regulated.

As the output current is brought close to the value corresponding to the point A, control is performed such that the peak value of the drain current of the switching element U2 is larger, or the switching frequency is increased. Therefore, the rate of a flyback period is gradually increased, thereby approaching a set value.

At the point A, the rate of a flyback period reaches the set value, and the flyback period is further increased due to the increase in the peak value of the drain current of the switching element U2 in a period ranging from A to B, so that the oscillation frequency of the frequency control unit 42 is decreased by controlling the rate of a flyback period, with the result that the peak value of the drain current of the switching element U2 is further increased, and thus the output voltage is regulated.

If the load is further increased and the output current reaches a value corresponding to the point B, the peak value of the drain current of the switching element U2 reaches the maximum value, that is, the maximum output point.

If the load is increased and is larger than the maximum output at the point B, the output voltage drops due to the lack of output power. The drop of the output voltage V0 causes the voltage of the secondary winding T1-2 of the transformer T1 to be decreased, with the result that a flyback period in increased. The frequency is decreased to an extent corresponding to the increase in the flyback period, so that the output voltage drops while the output current is only slightly increased. That is, when the load is increased to twice the value corresponding to the point B, the output voltage is halved while the output current is fixed. When the load is increased to five times the value corresponding to the point B, the output voltage decreases to ⅕ while the output current remains the same. Finally, if the load is increased further, the output voltage reaches the value corresponding to a point C.

(ii) Further, the case in which the output voltage is regulated by controlling the peak value of the drain current of the switching element U2 while the switching frequency of the switching element U2 is fixed will be described.

While output voltage varies from 0 to the value corresponding to the point A, the voltage error feedback unit 20 provides feedback, so that the peak value of the drain current of the switching element U2 is controlled, and thus the output voltage is regulated.

At the point A, the rate of a flyback period reaches the set value, and the flyback period is further increased due to the increase in the peak value of the drain current of the switching element U2 in a period ranging from A to B, so that the oscillation frequency of the frequency control unit 42 is decreased by controlling the rate of a flyback period.

If the load is increased further and reaches the value corresponding to the point B, the peak value of the drain current of the switching element U2 reaches the maximum value, that is, the maximum output.

If the load is increased and is larger than the maximum output at the point B, the peak value of the drain current of the switching element U2 is not increased any more, so that the output voltage drops. The drop of the output voltage Vo causes the voltage of the secondary winding T1-2 of the transformer T1 to be decreased, with the result that a flyback period is increased. The frequency is decreased to an extent corresponding to the increase in the flyback period, so that the output voltage drops while the output current is only slightly increased.

(iii) Further, the case in which the output voltage is regulated by controlling the switching frequency of the switching element U2 while the peak value of the drain current of the switching element U2 is fixed will be described.

In this case, the rate of a flyback period is maintained equal to or smaller than a set value until the output current reaches the value corresponding to the point B.

While the output current varies from 0 to the value corresponding to the point B, the voltage error feedback unit 20 provides feedback, so that the switching frequency of the switching element U2 is controlled, and thus the output voltage is regulated.

As the output current is brought close to the value corresponding to the point B, control is performed such that the switching frequency of the switching element U2 is increased. Thereafter, the rate of a flyback period is increased and is brought close to a set value.

At the point B, the rate of a flyback period reaches the set value, and the switching frequency of the switching element U2 is maximized at the point B, that is, the maximum output point. Here, the voltage of the feedback condenser Cfb2 drops from high voltage and the upper oscillation frequency of the frequency control unit 42 is set to the same frequency as the oscillation frequency fed back and controlled by the voltage error feedback unit 20. Thereafter, even when the load is increased further, an operation for constant voltage based on the increase in frequency is prevented.

If the load is increased and is larger than the maximum output at the point B, the switching frequency is not increased anymore, so that the output voltage drops due to the lack of the output power. The drop in the output voltage V0 causes the voltage of the secondary winding T1-2 of the transformer T1 to be decreased, with the result that the flyback period is increased. The upper limit oscillation frequency of the frequency control unit 42 is decreased to an extent corresponding to the increase in the flyback period, so that only output voltage drops while the output current is only slightly increased. That is, when the load is increased to twice the value of the point B, the output voltage is halved while the output current is fixed. When the load is increased to five times the value of the point B, the output voltage is decreased to ⅕ while the output current remains the same. Finally, if the load is increased further, the output voltage reaches the value corresponding to the point C.

As described above, when the rate of a flyback period in a cycle is larger than a set value, the present invention controls the oscillation frequency using voltage induced to the feedback winding T1-3 of the transformer T1, so that the rate of a flyback period in a cycle is maintained at a set value, with the result that power loss attributable to a current detection resistor on a secondary side is eliminated and high priced components, such as an opto-coupler and a comparator, are obviated, thereby reducing costs for components and assembly.

Second Embodiment

FIG. 9 is a diagram showing the configuration of a circuit for detecting output current information from the winding voltage of the transformer of an SMPS and a circuit for feeding back output current according to a second embodiment of the present invention. FIGS. 10 to 12 are waveform diagrams showing a process of detecting the output current information and controlling frequency using feedback according to the second embodiment of the present invention.

In FIG. 5, the feedback condenser Cfb2 is charged with the current from the current source I1, or the current of the feedback condenser Cfb2 is discharged through the current source I2 based only on the rate of a flyback period, so that the feedback condenser Cfb2 has limitation in gains to respond to infinitesimal variation in flyback period.

FIG. 9 shows a circuit in which a feedback condenser Cfb2 has high gains and can respond to infinitesimal variation in flyback period.

The output current feedback circuit of the SMPS according to the present invention includes an output current information detection circuit 61 for detecting output current information from voltage induced to the feedback winding T1-3 of a transformer T1, and a frequency control unit 42 for controlling oscillation frequency based on the output current information from the output current information detection circuit 61.

The output current information detection circuit 61 comprises a flyback period detection circuit 43 configured to detect a flyback period from voltage induced to the feedback winding T1-3, a first up/down control unit 62 configured to output charge current/discharge current according to detection output from the flyback period detection circuit 43, a first feedback condenser Cfb3 charged/discharged with the charge current/discharge current from the first up/down control unit 62, a comparison unit 63 configured to compare the charge voltage of the first feedback condenser Cfb3 with reference voltage Vref4, a second up/down control unit 64 configured to output charge current/discharge current according to the output of the comparison unit 63, and a second feedback condenser Cfb4 charged/discharged with the charge current/discharge current from the second up/down control unit 64.

The charge voltage of the second feedback condenser Cfb4 is applied to the frequency control unit 42 such that the upper limit oscillation frequency of the frequency control unit 42 is controlled.

In FIG. 9, a period, during which current is supplied to a load through a secondary winding T1-2, is indirectly detected by the flyback period detection circuit 43, which is commonly used, based on extraction voltage of the feedback winding T1-3. The detection output is used for the first up/down control unit 62 to charge/discharge the first feedback condenser Cfb3 such that the current of the first feedback condenser Cfb3 corresponds to a set value. The charge voltage of the first feedback condenser Cfb3 is compared with reference voltage Vref4 by the comparison unit 63. The output of the comparison unit 63 is used to charge/discharge the second feedback condenser Cfb4 such that the current of the second feedback condenser Cfb4 corresponds to a value set by the second up/down control unit 64. The voltage of the second feedback condenser Cfb4 is used to control the upper limit oscillation frequency of the frequency control unit 42.

FIGS. 10 to 12 are waveform diagrams showing the waveforms of the respective units of FIG. 9, and will be used to describe the operation of FIG. 9.

In the waveform diagrams of FIGS. 10 to 12, the waveform 'feedback winding voltage' indicates the voltage waveform of the feedback winding T1-3 of the transformer T1, the waveform 'flyback period' indicates the output waveform of the flyback period detection circuit 43, the waveform 'Cfb3 charge/discharge current' indicates a current waveform delivered to the first feedback condenser Cfb3 from the first up/down control unit 62, the waveform 'Cfb3 charge voltage' indicates the charge voltage waveform of the first feedback condenser Cfb3, the waveform 'Cfb4 charge voltage' indicates the charge voltage waveform of the second feedback condenser Cfb4, and the waveform 'oscillation waveform' indicates the oscillation waveform of the frequency control unit 42.

FIG. 10 is a waveform diagram showing the case in which a flyback period is shorter than a set value.

In the waveform 'feedback winding voltage' of FIG. 10, a time period T70 to T71 indicates the conduction period of the switching element U2, and a time period T71 to T72 indicates a flyback period during which energy stored in the primary winding T1-1 of the transformer T1 is transferred to the secondary winding T1-2.

During the flyback period, the output waveform of the flyback period detection circuit 43 is at an 'H' level, and during a non-flyback period T72 to T74, the output waveform of the flyback period detection circuit 43 is at an 'L' level.

During the time period T71 to T72, a TR Q3 is turned on and a TR Q4 is turned off, so that the first feedback condenser Cfb3 is charged by a current source I3. During the time period T72 to T74, the TR Q3 is turned off and the TR Q4 is turned on, so that the current of the first feedback condenser Cfb3 is discharged through a current source I4.

The rate of a flyback period, at which current control is started, is determined based on the rate of the sum of the currents of the current sources I3 and I11 to the current of the current source I4. Here, the current source I11 contains a temperature compensation value used to compensate for variation in current attributable to variation in temperature, and an adjustment value used by a user to adjust the set value of the rate of a flyback period from outside. In the case of a load in which the rate of a flyback period is smaller than a set value, the amount of the charge of the first feedback condenser Cfb3 during the flyback period is recovered by the discharge during the non-flyback period, so that the charge voltage of the first feedback condenser Cfb3 is always maintained lower than reference voltage Vref4, and the output of the comparison unit 63 is maintained at an 'H' level. Thereafter, the TR Q5 of the second up/down control unit 64 is turned on and the TR Q6 of the second up/down control unit 64 is turned off, so that the second feedback condenser Cfb4 is charged by a current source I5, thereby maintaining high voltage. The voltage is applied to the control input Vc1 of the frequency control unit 42, so that the upper limit value of the oscillation frequency of the frequency control unit 42 is the maximum value.

FIG. 11 is a waveform diagram showing the case in which the rate of the flyback period in a cycle is infinitesimally larger than a set value.

The amount of charge of the first feedback condenser Cfb3 during the flyback period is larger than the amount of discharge during the non-flyback period, so that the charge voltage of the feedback condenser Cfb2 gradually increases and reaches the reference voltage Vref4. The comparison unit 63 compares the charge voltage of the first feedback condenser Cfb3 with the reference voltage Vref4. During a time period T7a to T7b, during which the charge voltage of the first feedback condenser Cfb3 is lower than the reference voltage Vref4, the output of the comparison unit 63 is at an 'H' level, so that the TR Q5 of the second up/down control unit 64 is turned on and the TR Q6 of the second up/down control unit 64 is turned off, with the result that the second feedback condenser Cfb4 is charged by a current source I5.

Meanwhile, during a time period T7b to T7c, during which the charge voltage of the first feedback condenser Cfb3 is higher than the reference voltage Vref4, the output of the comparison unit 63 is at an 'L' level, so that the TR Q5 of the second up/down control unit 64 is turned off and the TR Q6 of the second up/down control unit 64 is turned on, with the result that the current of the second feedback condenser Cfb4 is discharged through the current source 16, and thus the charge voltage of the second feedback condenser Cfb4 is varied based on the rate of the charge time to the discharge time of the second up/down control unit 64.

The variation in charge voltage of the first feedback condenser Cfb3, attributable to infinitesimal variation in the flyback period, causes variation in the rate of a time period T7a to T7b to a time period T7b to T7c, so that the charge voltage of the second feedback condenser Cfb4 is varied, with the result that the oscillation frequency of the frequency control unit 42 is controlled according to the infinitesimal variation at gains, significantly higher than that of FIG. 5, thereby further precisely controlling output current.

FIG. 12 is a waveform diagram showing the case in which the rate of a flyback period in a cycle greatly exceeds a set value, and the rate of a flyback period is maintained at a set value by controlling a non-flyback period.

In the case in which the rate of a flyback period exceeds a set value, the charge period of the first feedback condenser Cfb3 is longer than the discharge period thereof in a cycle. Therefore, the charge voltage of the first feedback condenser Cfb3 gradually increases and then becomes higher than a reference voltage Vref4. Accordingly, the output of the comparison unit 63 is at an 'L' level in a whole cycle, and the TR Q5 of the second up/down control unit 64 is turned off and the TR Q6 of the second up/down control unit 64 is turned on, so that the current of the second feedback condenser Cfb4 is continuously discharged through a current source 16. Therefore, the upper limit oscillation frequency of the frequency control unit 42 is decreased. If the upper limit oscillation frequency of the frequency control unit 42 is lower than an oscillation frequency value set by the control input Vc2 fed back from the voltage error feedback unit 20, the oscillation frequency of the frequency control unit 42 is dominated by the control of the upper limit frequency of the second feedback condenser Cfb4. Accordingly, if the oscillation frequency of the frequency control unit 42 is decreased, the non-flyback period T72b to T74b of FIG. 12 is increased and the rate of a flyback period T71b to T72b in a cycle from T71b to T74b is decreased. If the rate of a flyback period T71b to T72b is decreased and is smaller than a set value, the charge period of the first feedback condenser Cfb3 is shorter than the discharge period thereof. Therefore, the charge voltage of the first feedback condenser Cfb3 drops again. Finally, while the charge voltage of the first feedback condenser Cfb3 varies above and below the reference voltage Vref4, the rate of the time period T7a1 to T7b1, during which the charge voltage of the first feedback condenser Cfb3 is lower than the reference voltage Vref4, to the time period T7b1 to T7c1, during which the charge voltage of the first feedback condenser Cfb3 is higher than the reference voltage Vref4, is maintained at a set value, thereby realizing the regulation thereof.

In FIG. 9, feedback from the voltage error feedback unit 20 can be used to control the only peak value of the drain current of the switching element U2, to control the only frequency of the frequency control unit 42, and to control both the peak value of the drain current of the switching element U2 and the frequency of the frequency control unit 42.

In FIG. 9, the comparison unit 63, the second up/down control unit 64, and the feedback condenser Cfb4 may be replaced by a single amplification unit, thereby controlling the upper limit oscillation frequency of the frequency control unit 42 by amplifying the difference between error voltage and reference voltage Vref4.

Third Embodiment

In FIGS. 5 and 9, the value of feedback is provided by calculating the average rate of flyback periods. In the case in which the charge/discharge time constant of the feedback condenser is long and the load is rapidly varied, there is a limitation in the realization of a sufficiently fast response speed.

FIG. 13 is a diagram showing the configuration of a circuit for detecting output current in each cycle so as to limit the output current, and feeding back current based on the detection in each cycle according to a third embodiment of the present invention. FIGS. 14 to 16 are waveform diagrams showing a process of controlling frequency by detecting output current and providing feedback according to the third embodiment of the present invention.

In the configuration thereof, a switching element U2 is connected to one end of the primary winding T1-1 of a transformer T1, a secondary winding T1-2, closely coupled to the primary winding T1-1 of the transformer T1, is installed as a main energy extraction unit so as to supply energy to the output unit. Further, a feedback winding T1-3 is installed in the transformer T1 and is used to extract output current information through the feedback winding T1-3.

An output current feedback circuit according to the third embodiment of the present invention comprises an output current information detection circuit 81 for detecting output current information from voltage induced to the feedback winding T1-3 of the transformer T1, and a frequency control unit 84 configured to be controlled such that oscillation is continued or is temporarily stopped based on the output of the output current information detection circuit 81.

The output current information detection circuit 81 comprises a flyback period detection circuit 43 configured to detect a flyback period from voltage induced to the feedback winding, an up/down control unit 82 configured to output charge current or discharge current according to the detection output of the flyback period detection circuit 43, a feedback condenser Cfb5 charged/discharged with the charge current/discharge current from the up/down control unit 82, and a comparison unit 83 configured to compare the voltage of the feedback condenser Cfb5 with a reference voltage Vref5 and to output the results of the comparison to the frequency control unit 84.

For a description of the operation of the above-described output current feedback circuit, the flyback period detection circuit 43, which is commonly used, indirectly detects a period during which current is supplied to a load through the secondary winding T1-2, from voltage induced to the feedback winding T1-3. The detected output is used for the up/down control unit 82 to charge/discharge the feedback condenser Cfb5 such that the current of feedback condenser Cfb5 corresponds to a set value. The charge voltage of the feedback condenser Cfb5 is compared with a reference voltage Vref5 by the comparison unit 83, and the output of the comparison unit 83 is used to perform control such that the oscillation of the frequency control unit 84 is temporarily stopped.

FIGS. 14 to 16 are waveform diagrams showing the waveforms of the respective units of FIG. 13 based on operation conditions, and will be used to describe the operation of FIG. 13.

In waveform diagrams of FIGS. 14 to 16, the waveform 'feedback winding voltage' indicates the voltage waveform of the feedback winding T1-3 of the transformer T1, the waveform 'flyback period' indicates the output waveform of the flyback period detection circuit 43, the waveform 'Cfb5 charge/discharge current' indicates a current waveform delivered to the feedback condenser Cfb5 by the up/down control unit 82, the waveform 'Cfb5 charge voltage' indicates the charge voltage waveform of the feedback condenser Cfb5, the waveform 'comparison output voltage' indicates the output voltage waveform of the comparison unit 83, and the waveform 'oscillation waveform' indicates the oscillation waveform of the frequency control unit 84.

FIG. 14 is a waveform diagram showing the case in which a flyback period is shorter than a set value.

In the case of the waveform 'feedback winding voltage' of FIG. 14, a time period T90 to T91 indicates a conduction period of the switching element U2, and a time period T91 to T92 indicates a flyback period during which energy, stored in the primary winding T1-1 of the transformer T1, is transferred to the secondary winding T1-2. During the flyback period, the output waveform of the flyback period detection circuit 43 is at an 'H' level, and during the time period T92 to T94, the output waveform of the flyback period detection circuit 43 is at an 'L' level.

During the flyback period, a TR Q7 is turned on and a TR Q8 is turned off, so that the feedback condenser Cfb5 is charged by a current source 17 and a current source I11. During the non-flyback period, the TR Q7 is turned off and the TR Q8 is turned on, so that the current of the feedback condenser Cfb5 is discharged through a current source 18. Here, the current source I11 contains a temperature compensation value used to compensate for variation in current attributable to variation in temperature, and an adjustment value that a user used to adjust the set value of the rate of a flyback period from outside.

The rate of the sum of the currents of the current sources 17 and I11 to the current of the current source 18 determines the rate of a flyback period at which the current control is started. In the case of a load in which the rate of a flyback period is smaller than a set value, the amount of charge of the feedback condenser Cfb5 during a flyback period is recovered by the discharge during the non-flyback period, so that the charge voltage of the feedback condenser Cfb5 is always maintained at a lower voltage than reference voltage Vref5, and the output voltage of the comparison unit 83 is maintained at an 'L' level. Further, voltage, which is at an 'L' level, is applied to the control input 'Hold' of the frequency control unit 84, and the oscillation of the frequency control unit 84 is continued.

Although the oscillation frequency of the frequency control unit 84 is controlled by control input Vc2, fed back from the voltage error feedback unit 20, occasionally, the oscillation frequency of the frequency control unit 84 may be a fixed frequency, in which case the control input Vc2 fed back from the voltage error feedback unit 20 is not received. However, the upper limit oscillation frequency of the frequency control unit 84 is not separately controlled.

FIG. 15 is a waveform diagram at a load in which the rate of a flyback period in a cycle reaches a set value.

When the amount of charge of the feedback condenser Cfb5 during a flyback period is infinitesimally larger than the amount of discharge thereof during a non-flyback period, the charge voltage of the feedback condenser Cfb5 gradually increases and the charge voltage of the feedback condenser Cfb5 reaches a reference voltage Vref5 at the end portion of the flyback period. If the charge voltage of the feedback condenser Cfb5 is higher than the reference voltage Vref5 even for a short time period, the output voltage of the comparison unit 83 is changed to an 'H' level. The oscillation of the frequency control unit 84 is temporarily stopped when the output voltage of the comparison unit 83 is being at an 'H' level. Further, after the flyback period is completed, the output voltage of the comparison unit 83 is maintained at an 'H' level until the voltage, which is charged and becomes higher than the reference voltage Vref5 of the feedback condenser Cfb5, is discharged and becomes equal to or lower than the reference voltage Vref5. Further, the oscillation of the frequency control unit 84 is maintained in the state in which it is temporarily stopped. If the voltage of the feedback condenser Cfb5 is higher than the reference voltage Vref5 during the flyback period of a set period, the oscillation of the frequency control unit 84 is temporarily stopped until the increased voltage is discharged and becomes lower than the reference voltage Vref5. Therefore, the non-flyback period is increased to the extent of the temporarily stopped period of the non-flyback period. Accordingly, in a load at the critical point, at which the rate of a flyback period in a cycle barely exceeds a set value, the maximum value of the charge voltage of the feedback condenser Cfb5 is maintained at a voltage level that is the same as the reference voltage Vref5.

Therefore, until which the rate of a flyback period in a cycle barely exceeds a set value, the oscillation frequency of the frequency control unit 84 is controlled and determined by the control input Vc2 fed back from the voltage error feedback unit 20.

FIG. 16 is a waveform diagram showing the case in which the rate of a flyback period in a cycle exceeds a set value, and the rate of a flyback period is maintained at a set value by controlling a non-flyback period.

If the rate of a flyback period increases and exceeds a set value, the voltage of the feedback condenser Cfb5 is charged up to the reference voltage Vref5 by a current source 17 during a flyback period immediately before the oscillation of the frequency control unit 84 is temporarily stopped, and the feedback condenser Cfb5 is continuously charged and exceeds the reference voltage Vref5 during a remaining part of the period corresponding to the rate exceeding the set value. Therefore, during the remaining part of the period corresponding to the rate exceeding the set value, the output of the comparison unit 83 is at an 'H' level, and the oscillation of the frequency control unit 84 is temporarily stopped during this period. When the flyback period is completed at a time point T92b, the current of the feedback condenser Cfb5 is started to be discharged through a current source 18. Until the voltage of the feedback condenser Cfb5 is lower than the reference voltage Vref5, the output of the comparison unit 83 is maintained at an 'H' level and the oscillation of the frequency control unit 84 is maintained in a temporarily stopped state continuously.

At a time point T9b, if the voltage of the feedback condenser Cfb5 is lower than the reference voltage Vref5, the output of the comparison unit 83 is changed to an 'L' level and the oscillation of the frequency control unit 84 is continued again. After the remaining portion of the oscillation waveform is completed, a new cycle is started at a time point T93b.

The rate of the time period T91b to T9a to the time period T9b to T94b in FIG. 16 is the same as the rate of a time period T91a to T92a to a time period T92a to T94a in FIG. 15. Further, the sum of the time period T91b to T9a and the time period T9b to T93b in FIG. 16 is the same as the sum of the time period T91a to T92a and the time period T92a to T94a. However, the non-flyback period is extended at the rate at which the flyback period is extended in FIG. 16, and the rate is identical to the rate at which the flyback period is extended in FIG. 15. Therefore, the value of the rate of a flyback period to the non-flyback period in a cycle is maintained at a constant value, and output current may be kept constant.

In FIG. 16, even in the case of the fixed load, the conduction time period T93b to T94b of the switching element U2 varies at every moment due to the ripple of input voltage or the response of a feedback loop. Such variation causes variation in the charge voltage at the start point of the flyback period of the feedback condenser Cfb5.

When output voltage and the peak drain current of the switching element are constant under a fixed load condition, a flyback period is fixed. If the feedback condenser Cfb5 starts to be charged with voltage that is lower than the voltage shown in FIG. 16 at the start point of the flyback period in a certain cycle, the time period taken for the voltage of the feedback condenser Cfb5 to reach the reference voltage Vref5 is increased. In the flyback period, the time period during which the voltage of the feedback condenser Cfb5 is higher than the reference voltage Vref5 is decreased to the extent that the time period during which the voltage of the feedback condenser Cfb5 is lower than the reference voltage Vref5 is increased. Further, in the non-flyback period, the time period taken for the voltage of the feedback condenser Cfb5 to be discharged to be lower than the reference voltage Vref5 is decreased. Thereafter, the frequency control unit 84 continues to perform oscillation for the remaining part of the cycle, and starts a new cycle. Here, to the extent that the time period taken for the voltage of the feedback condenser Cfb5 to reach the reference voltage Vref5 is increased in the flyback period, the time period taken for the frequency control unit 84 to complete the remaining part of the cycle after the time point at which the voltage of the feedback condenser Cfb5 is decreased below the reference voltage Vref5 in the non-flyback period is decreased. As a result, the voltage of the feedback condenser Cfb5 at the start point of the flyback period in a subsequent cycle is increased by the difference corresponding to the decreased voltage of the feedback condenser Cfb5 at the start point of the flyback period in a previous cycle. If charging is started at this increased voltage in a flyback period, the time period taken for the voltage of the feedback condenser Cfb5 to reach the reference voltage Vref5 is shorter than the time period shown in FIG. 16 by the increase in the time period in the previous cycle. The time period during which the voltage of the feedback condenser Cfb5 is higher than the reference voltage Vref5 in the flyback period is increased by the decreased in the time period during which the voltage of the feedback condenser Cfb5 is lower than the reference voltage Vref5. Further, the time period taken for the voltage of the feedback condenser Cfb5 to be discharged to be lower than the reference voltage Vref5 in the non-flyback period is increased. Thereafter, the frequency control unit 84 continues to perform oscillation in the remaining part of the cycle, and starts a new cycle. Further, as the time period taken for the voltage of the feedback condenser Cfb5 to reach the reference voltage Vref5 is decreased in the flyback period, the time period taken for the frequency control unit 84 to complete the oscillation in the remaining part of the cycle after the voltage of the feedback condenser Cfb5 is lowered below the reference voltage Vref5 in the non-flyback period is increased. Therefore, the voltage of the feedback condenser Cfb5 is discharged until it becomes the decreased voltage at the start point of the previous cycle, and is then charged again in a subsequent flyback period. In this way, the behavior of the voltage in the previous two cycles is repeated in a new cycle. Accordingly, the period of temporary stoppage for the first cycle is shorter than that of FIG. 16, and the period of temporary stoppage for a subsequent cycle is longer than that of FIG. 16. As a result, the sum of the periods of temporary stoppage, which are increased and decreased for the two cycles, is balanced, so that the average of the periods of temporary stoppage for the two cycles is identical with the waveform in FIG. 16, and thus the error of current control, attributable to the charge start point of a flyback period for the feedback condenser Cfb5, does not occur.

As described in conjunction with FIG. 16, the rate of the flyback period is detected in each cycle. If the rate exceeds a set value, the oscillation of the frequency control unit 84 is temporarily stopped in a flyback period for a time exceeding set value and in a non-flyback period for a time corresponding to the exceeding rate of flyback period, so that the cycle of the oscillation frequency is controlled such that the rate of a flyback period to a non-flyback period is constantly maintained.

In this embodiment, a small-capacity feedback condenser Cfb5 having small charge and discharge time constants immediately detects the variation in the rate of a flyback period in each switching cycle, and applies this to the oscillation control input unit 'Hold' of the frequency control unit 84. Therefore, this embodiment has advantages of a fast response speed, and minimizing area for silicon upon integration using the small-capacity feedback condenser Cfb5.

Fourth Embodiment

In the case of the output current feedback circuit according to the third embodiment, a flyback period is increased as an amount corresponding to the time delayed due to ringing, compared to the current supply period of the secondary winding T1-2, as shown in FIGS. 14 to 16.

The error of a flyback period attributable to ringing, compared to the current supply period of the secondary winding T1-2, is greatest when the frequency is high. In contrast, when the frequency is low, the rate of a ringing to flyback period is decreased. The variation in rate occupied by ringing causes the variation in value of output current to be controlled. Therefore, when output voltage is decreased and the frequency is low, output current is increased.

For the reason described above, the current at the point C has an increased value, compared to the current at the point B in FIG. 18.

The fourth embodiment, for which the error of current control of the first to third embodiments are compensated, and which achieves the characteristics shown in FIG. 19, will be described in detail below.

FIG. 17 shows an output current information detection circuit 101 which further comprises a current control unit 102 for superimposing the current from a current source 19 to a feedback condenser Cfb5 according to the results of the comparison of the comparison unit 83 in the output current feedback circuit according to the third embodiment of the present invention shown in FIG. 13.

In FIG. 17, the TR Q9 of the current control unit 102 is turned on during the period of temporary stoppage of the frequency control unit 84, and the current from the current source 19 is superimposed and supplied to the feedback condenser Cfb5 in addition. Therefore, charge current is increased during a period of temporary stoppage in a flyback period, and discharge current is decreased during a period of temporary stoppage in a non-flyback period. That is, charge current is increased during the period of temporary stoppage in the flyback period, and discharge current is decreased during the period of temporary stoppage in the non-flyback period. Therefore, the rate of the period of temporary stoppage in the non-flyback period is slightly larger than the rate of the period of temporary stoppage in the flyback period, so that the rate of the non-flyback period is increased when the frequency is low, with the result that output current is decreased, thereby correcting the increase of current attributable to the error of current control.

FIG. 20 shows an example in which an output current feedback circuit according to the present invention is applied to a flyback converter which does not have additional auxiliary winding for feedback, and FIG. 21 shows an example in which an output current feedback circuit according to the present invention is applied to a buck-boost converter.

Although the technical spirit of the present invention has been described in conjunction with the accompanying drawings above, the description is intended to describe the preferred embodiments of the present invention for illustrative purposes only, and is not intended to limit the present invention. Furthermore, it will be apparent to those skilled in the art that various variations and modifications are possible within a range that does not depart from the scope of the technical spirit of the present invention.

For example, the TR Q1 and TR Q2 of the up/down control circuit 44 shown in FIG. 5, the TR Q3 and TR Q4 of the first up/down control circuit 62 and the TR Q5 and TR Q6 of the second up/down control circuit 64 shown in FIG. 9, and the TR Q7 and TR Q8 of the up/down control circuit 82 shown in FIG. 13 can be replaced with a P-channel Field Effect Transistor (FET) and an N-channel FET. Further, it is apparent that the polarity of charge/discharge current and charge/discharge voltage shown in the feedback condenser Cfb2, the first feedback condenser Cfb3, the second feedback condenser Cfb4, and the feedback condenser Cfb5 may be different from the description of the operations of the embodiments described above. Furthermore, internal circuits, included in the up/down control circuit 44 shown in FIG. 5, the first up/down control circuit 62 and the second up/down control circuit 64 shown in FIG. 9, and the up/down control circuit 82 shown in FIG. 13, described in the above embodiments, are not limited to the circuits shown in FIGS. 5, 9, and 13. Further, the up/down control circuit 44 shown in FIG. 5, the first up/down control circuit 62 and the second up/down control circuit 64 shown in FIG. 9, and the up/down control circuit 82 shown in FIG. 13 may be simply constructed such that the feedback condenser Cfb2, the first feedback condenser Cfb3, the second feedback condenser Cfb4, and the feedback condenser Cfb5 are charged/discharged based on input voltage only using a single resistor connected in series between an input unit and an output unit. Therefore, the up/down control circuit 44 shown in FIG. 5, the first up/down control circuit 62 and the second up/down control circuit 64 shown in FIG. 9, and the up/down control circuit 82 shown in FIG. 13 include all types of circuits for performing control such that the feedback condenser Cfb2, the first feedback condenser Cfb3, the second feedback condenser Cfb4, and the feedback condenser Cfb5 are charged/discharged based on input voltage.

The present invention can be applied to an SMPS power supply circuit.

What is claimed is:

1. A discontinuous mode flyback converter, including a transformer configured to store magnetic energy using excitation current and to transfer the magnetic energy using a primary winding and a secondary winding closely coupled to the primary winding, a switching element coupled to one end of the primary winding of the transformer and configured to control current of the primary winding of the transformer, a control unit configured to control the switching element, and a voltage error feedback unit for feeding back an error of output voltage of the transformer to the control unit, thereby regulating the output voltage, said discontinuous mode flyback converter comprising:

an output current feedback circuit for detecting a flyback period of the transformer, increasing a switching period of the switching element when a rate of a flyback period excesses a setting value in a cycle, and feeding back to the control unit for holding the rate of the flyback period with the setting value in a cycle.

2. The discontinuous mode flyback converter according to claim 1, wherein the output current feedback circuit limits the output current of the transformer by detecting the output current information of the transformer from the winding voltage of the transformer and controlling an oscillation frequency of the control unit.

3. The discontinuous mode flyback converter according to claim 1, wherein the output current feedback circuit limits the output current of the transformer by detecting output current information of the transformer from the winding voltage of the transformer and controlling a period during which oscillation of the control unit is temporarily stopped.

4. A discontinuous mode flyback converter including a magnetic energy transfer element configured to store magnetic energy using excitation current and to transfer energy using a primary winding and a secondary winding, closely coupled to the primary winding, a switching element coupled to one end of the primary winding of the magnetic energy transfer element and configured to control current of the primary winding of the magnetic energy transfer element, a control unit configured to control the switching element, and a voltage error feedback unit configured to feed back an error of the output voltage of the secondary winding of the magnetic energy transfer element to the control unit, thereby regulating the output voltage, the discontinuous mode flyback converter comprising:

an output current feedback circuit for detecting a flyback period of the transformer, increasing a switching period of the switching element when a rate of a flyback period excesses a setting value in a cycle, and feeding back to the control unit for holding the rate of the flyback period with the setting value in a cycle, wherein the longer the switching period of the switching element is, the more the setting value decreases.

5. A method for detecting an output current information and limiting the output current of a Switching Mode Power Supply (SMPS) based on winding voltage of a magnetic energy transfer element of the SMPS, including a step of storing energy in the magnetic energy transfer element and transferring the energy; a step of switching between the storing energy in the magnetic energy transfer element and the transferring the energy; a step of controlling the switching between the storing energy in the magnetic energy transfer element and the transferring the energy; a voltage error feedback step of feeding back an error of output voltage of the magnetic energy transfer element to the step of controlling the switching, thereby regulating the output voltage, the method comprising:

detecting a flyback period of the magnetic energy transfer element, forming an output current feedback step;

increasing a switching period of the switching step when a rate of a flyback period excesses a setting value in a cycle; and feeding back to the controlling step for holding the rate of the flyback period with the setting value in a cycle.

6. The method according to claim 5, wherein the output current feedback step is performed to limit the output current by detecting the output current information of the magnetic energy transfer element from winding voltage of the magnetic energy transfer element and controlling an oscillation frequency of the step of controlling the switching.

7. The method according to claim 5, wherein the output current feedback step is performed to limit the output current by detecting the output current information of the magnetic energy transfer element from winding voltage of the magnetic energy transfer element and controlling a period during which oscillation is temporarily stopped in the step of controlling the switching.

8. The method according to claim 5, wherein the longer the switching period in the switching step is, the more the setting value in the output current feedback step decreases.

9. The method according to claim 8, wherein the output current feedback step is performed to limit the output current by detecting the output current information of the magnetic energy transfer element from winding voltage of the magnetic energy transfer element and controlling an oscillation frequency of the step of controlling the switching.

10. The method according to claim 8, wherein the output current feedback step is performed to limit the output current by detecting the output current information of the magnetic energy transfer element from winding voltage of the magnetic energy transfer element and controlling a period during which oscillation is temporarily stopped in the step of controlling the switching.

* * * * *